US006603867B1

(12) United States Patent
Sugino et al.

(10) Patent No.: US 6,603,867 B1
(45) Date of Patent: Aug. 5, 2003

(54) THREE-DIMENSIONAL OBJECT IDENTIFYING SYSTEM

(75) Inventors: Hajime Sugino, Nakai-machi (JP); Kensuke Ito, Nakai-machi (JP); Tadashi Shimizu, Nakai-machi (JP); Kaoru Yasukawa, Nakai-machi (JP); Katsura Sakai, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/385,033

(22) Filed: Aug. 30, 1999

(30) Foreign Application Priority Data

Sep. 8, 1998 (JP) ............................................ 10-253568
Mar. 29, 1999 (JP) ............................................ 11-085918

(51) Int. Cl.$^7$ ............................ G06K 9/00; G01B 11/00
(52) U.S. Cl. ....................... 382/115; 382/154; 382/203; 340/5.82; 356/394; 356/601
(58) Field of Search ................................. 382/115, 118, 382/124, 154, 203; 356/601–604, 610, 394; 340/5.1, 5.2, 5.8, 5.81–58.83, 5.52, 5.53

(56) References Cited

U.S. PATENT DOCUMENTS

| | | | | |
|---|---|---|---|---|
| 3,602,594 A | * | 8/1971 | Cook et al. | 356/5.1 |
| 4,294,544 A | * | 10/1981 | Altschuler et al. | 356/512 |
| 4,443,706 A | * | 4/1984 | DiMatteo et al. | 250/558 |
| 4,736,203 A | * | 4/1988 | Sidlauskas | 340/5.53 |
| 5,229,764 A | * | 7/1993 | Matchett et al. | 340/5.52 |
| 5,329,359 A | * | 7/1994 | Tachikawa | 356/394 |
| 5,335,288 A | * | 8/1994 | Faulkner | 382/115 |
| 5,351,126 A | * | 9/1994 | Takada et al. | 250/559.22 |
| 5,515,163 A | * | 5/1996 | Kupershmidt et al. | 356/338 |
| 5,745,591 A | * | 4/1998 | Feldman | 382/115 |
| 5,886,788 A | * | 3/1999 | Kobayashi | 356/391 |
| 6,151,118 A | * | 11/2000 | Norita et al. | 356/602 |
| 6,330,346 B1 | * | 12/2001 | Peterson et al. | 382/115 |
| 6,343,140 B1 | * | 1/2002 | Brooks | 348/156 |

FOREIGN PATENT DOCUMENTS

| | | |
|---|---|---|
| JP | B2-62-44206 | 9/1987 |
| JP | A-2-181880 | 7/1990 |
| JP | A-6-3122 | 1/1994 |
| JP | A-6-201342 | 7/1994 |
| JP | A-10-94534 | 4/1998 |

OTHER PUBLICATIONS

Stockman et al., "Sensing and Recognition of Rigid Objects Using Structured Light." IEEE Control Systems Magazine, Jul. 198 pp. 14–22.*
Carmer et al. "Laser Radar in Robotics." Proc. of the IEEE, vol. 84, No. 2, Feb. 1996, pp. 299–320.*

* cited by examiner

Primary Examiner—Jon Chang
(74) Attorney, Agent, or Firm—Oliff & Berridge, PLC

(57) ABSTRACT

A three-dimensional object identifying system is disclosed which identifies a three-dimensional shape object optically such as a part of a human body for preventing an information apparatus such as a personal computer from being used by any other illegitimate user than a legitimate user. The three-dimensional object identifying system has a function generating unit which generates modulation signals, light emitting elements which emit lights based on the modulation signals to a three-dimensional object, light receiving elements which receive reflected lights from the three-dimensional object and which produce detection signals, a correlation detecting unit which detects correlation information between each detection signal and modulation signal, and an identifying unit which performs identifying processing for the three-dimensional object on the basis of both pre-cataloged correlation information and the detected correlation information.

34 Claims, 12 Drawing Sheets

THREE-DIMENSIONAL OBJECT IDENTIFYING SYSTEM

BACKGROUND OF THE INVENTION

1. Field of the Invention

The present invention relates to a three-dimensional object identifying system for identifying a three-dimensional-shape object optically. For example, the invention is concerned with a three-dimensional object identifying system for identifying a part of a human body in order to prevent an information apparatus such as a personal computer from being used illegitimately by a user other than a legitimate user thereof.

2. Description of the Prior Art

Heretofore, as a three-dimensional object identifying system for identifying a three-dimensional-shape object, there has been known a system in which a three-dimensional shape is inputted from an object and the object is identified on the basis of the three-dimensional shape. As an input device for inputting a three-dimensional shape from an object, there has been used practically or proposed an input device wherein a three-dimensional shape of an object is inputted from a displacement (i.e., parallax) of images obtained from plural cameras or an input device wherein a slit light or a laser spot light is scanned and radiated to a three-dimensional object, then the reflected image is taken in and a three-dimensional shape of the object is inputted.

For example, a method of recognizing a three-dimensional shape with use of two cameras is described in Japanese Published Unexamined Patent Application No. Hei 6-3122. According to this method, a three-dimensional information of an object to be measured is photographed with use of two cameras and in accordance with image signals obtained from the cameras a parallax is converted to a color distribution using two liquid crystal displays and prism, thereby recognizing the height, etc. of the object.

A method which comprises scanning and radiating a laser spot light and inputting a three-dimensional shape is described in Japanese Published Unexamined Patent Application No. Hei 6-201342. According to this method, a monochromatic laser spot light of RGB is scanned and radiated to an object to be measured and the distance and color of the object are taken in exactly on the basis of displacement of the observation position obtained by resolving the RGB components on a detection side. According to this method, moreover, a radiation light is modulated with a modulation signal to improve the selection accuracy on the detection side of the monochromatic light of RGB, thereby making it possible to acquire required information accurately even in the event of a sudden change in the surface shape or color of the object.

Further, a proximity sensor is described in Japanese Published Examined Patent Application No. Sho 62-44206 in which light rays are radiated to an object from a pair of light sources adapted to be driven with repeat signals which are 90° out of phase with each other, then reflected light rays of the radiated light rays from the object are received by a light receiving element, and the distance between the light receiving element and the object is detected on the basis of the phase difference. By scanning this proximity sensor over a three-dimensional object through a mechanical part such as a robot arm, the input of a three-dimensional shape can be implemented with a simple sensor structure.

In all of the above three-dimensional object inputting methods, the three-dimensional object is inputted as a three-dimensional image or as a distance image obtained by imaging the distance from a reference position. For identifying the three-dimensional object, it is necessary that the three-dimensional images obtained by the above methods be further subjected to identifying processing.

As to the identification processing, for example in Japanese Published Unexamined Patent Application No. Hei 2-181880 there is described a method wherein a local surface of a distance image is taken out, then an approximate expression of the surface is obtained by a least squares method, and coefficients of the approximate expression are evaluated to detect a three-dimensional shape. Also other than this method there have been proposed and adopted actually a large number of methods for identifying a three-dimensional shape, in all of which a three-dimensional shape of a three-dimensional object is inputted accurately as data and the three-dimensional object is identified in accordance with the data of the three-dimensional shape.

Three-dimensional object identifying systems include systems which identify a part of a human body as a three-dimensional object. For example, Handkey-Hand Reader (trade name) of RECOGNITION SYSTEMS, INC., in the U.S. permits identifying an individual from the shape of a human hand. For identifying an individual by using this system, the user is required to put his or her hand into the system.

In Japanese Published Unexamined Patent Application No. Hei 10-94534 is disclosed an individual identifying system using a special instrument which detects a three-dimensional shape of an auricle through a plurality of light emitting portions and a plurality of light receiving portions. In this system, the plural light emitting portions disposed within the special instrument are allowed to emit light successively, then the lights reflected from the auricle are detected by the light receiving portions, and the individual is identified from a time series-like pattern of detected signals. In the event an extraneous light which changes with time, say, an illumination light from an AC-lit fluorescent lamp or light from a CRT (Cathode-RayTube) for display, is mixed into the light receiving portions, an influence is exerted on the time series-like signal pattern in the light receiving portions which underlies the identification, and thus it is impossible to effect accurate identification. Consequently, it is required to use some light shielding member.

Thus, in the above two systems for identifying a part of a human body as a three-dimensional object, the user is required to perform some troublesome operation or use a special instrument at the time of identifying an individual.

In the above conventional three-dimensional object identifying systems it is necessary to input a three-dimensional shape of an object accurately and identify the thus-acquired three-dimensional shape accurately by electronic or optical processing. Since the processing is complicated, there arises the problem that the systems become complicated and become larger in size. In addition, in the case of inputting a three-dimensional shape optically, it is necessary in many cases to define environmental conditions such as exterior lighting conditions, and the system concerned is sometimes unemployable in environmental conditions in which there is used such an information apparatus as a personal computer, for example, in an office or in a home.

In the above conventional system which uses a human hand for identifying a legitimate user of an information apparatus such as a personal computer, the size of the system is too large for attachment thereof to such an information apparatus as a personal computer. Further, the user is required to put his or her hand consciously into the system and put it at a predetermined position, thus giving rise to the problem that the user is given a sense of incongruity.

In the above conventional system which identifies an individual on the basis of the shape of an auricle, the user is required to attach a special instrument to his or her ear at the time of the identifying operation, and here again the use will have a sense of incongruity.

SUMMARY OF THE INVENTION

It is a purpose of the present invention to provide a three-dimensional object identifying system which is small-sized and simple in construction and which can identify a three-dimensional object. It is another purpose of the present invention to provide a three-dimensional object identifying system capable of identifying an individual without giving a sense of incongruity to a user.

According to the present invention, the above purposes can be achieved by a three-dimensional object identifying system comprising a signal generating part that generates a modulation signal, a light emitting part that emits light based on the modulation signal to a three-dimensional object, a light receiving part that receives light reflected from the three-dimensional object and produces a detection signal, a detecting part that detects a correlation information of the detection signal and the modulation signal, and identifying part that performs an identifying processing for the three-dimensional object in accordance with pre-cataloged correlation information and the detected correlation information.

According to the present invention, the above purposes can be achieved by a three-dimensional object identifying system combined with the above system, wherein the light emitting part and the light receiving part are incorporated in a user interface device of an information apparatus.

Further, according to the present invention, the above purposes can be achieved by an information apparatus comprising a general-purpose input part that performs input of information responsive to an input operation of an input operator, a processing unit that processes the information inputted from the general-purpose input part, a light emitting part that radiates light to the input operator, a light receiving part that receives reflected light from the input operator, and an identifying part that acquires from the light receiving part light intensity information proportional to a body posture of the input operator when using the input part and which performs identifying processing for the input operator in accordance with the light intensity information and cataloged information.

BRIEF DESCRIPTION OF THE DRAWINGS

FIG. 2, comprising

DETAILED DESCRIPTION OF A PREFERRED EMBODIMENT

Figure 1:
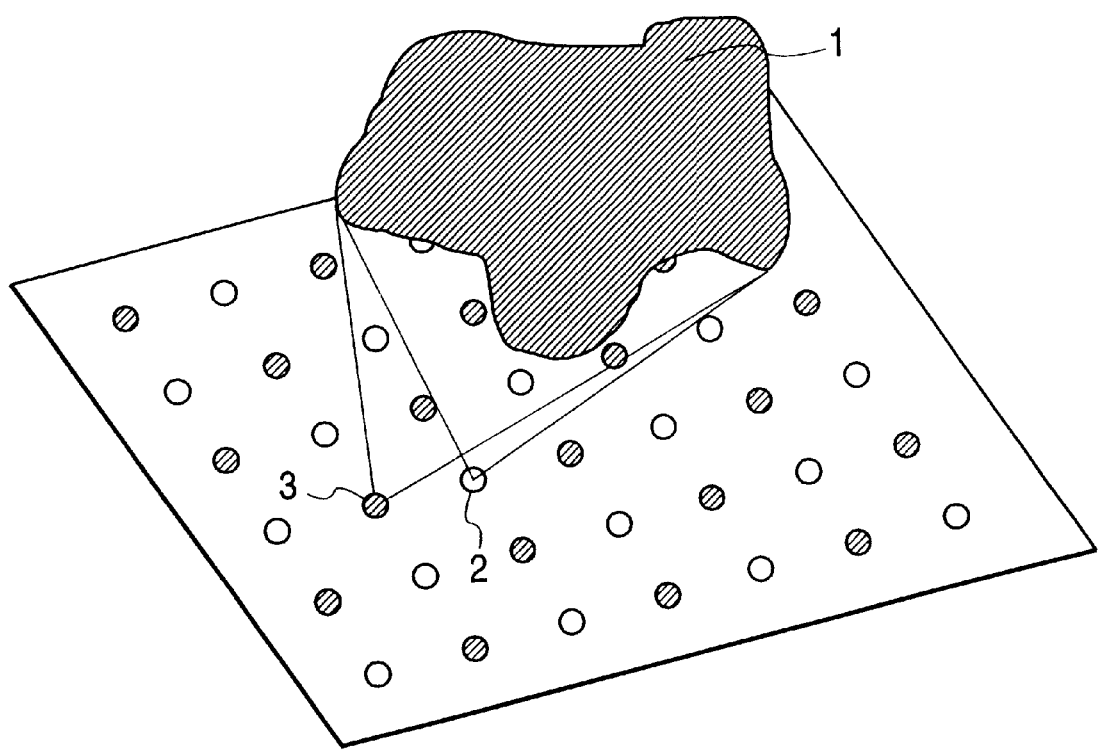
FIG. 1 is a diagram showing an appearance configuration of part of a three-dimensional object identifying system according to an embodiment of the present invention.

A three-dimensional object identifying system according to an embodiment of the present invention will be described hereunder with reference to FIGS. 1 to 19. A description will be directed first to a schematic appearance configuration of part of the three-dimensional object identifying system with reference to FIG. 1.

The three-dimensional object identifying system is provided with at least one light emitting element 2 for emitting light to a three-dimensional object 1 and at least one light receiving element 3 for receiving reflected light from the three-dimensional object 1 and outputting a detection signal proportional to the reflected light.

As the light emitting element 2 there may be used, for example, a light emitting diode, a semiconductor laser, or an incandescent lamp. But a light emitting diode is most suitable because the power of consumption is small, a sufficient light intensity can be obtained, radiated light has an extent, it has a sufficient response speed for the modulation of light and is inexpensive. As the light radiated from the light emitting element 2 there may be used a visible light and an infrared light, but the use of an infrared light (say, wavelength of 800 to 900 nm) is effective because it is difficult to be seen by the human eyes and does not give a sense of incongruity to man.

As the light receiving element 3 there may be used, for example, a photodiode, a phototransistor, a cadmium sulfide element, or a CCD, but a photodiode or a phototransistor is suitable in point of sensitivity, response speed and price. In the case of an infrared light being emitted from the light emitting element 2, it is preferable that a filter which cuts off a visible light and which permits the passage therethrough of light having the same wavelength as that of the light emitted from the light emitting element 2 be mounted in a light receiving portion of the light receiving element 2. With such a filter, it is possible to further suppress the influence of an extraneous light such as illumination light and substantially improve the sensitivity and hence improve the identification accuracy in an identifying processing which will be described later.

The following description is now provided about the quantity of reflected light (hereinafter referred to as "reflected light intensity") which is received by the light receiving element 3 and which is used for identifying the three-dimensional object in the three-dimensional object identifying system.

The reflected light intensity in the light receiving element 3 is determined by the position of the light emitting element 2, the surface quality and shape of the three-dimensional object 1, and the position of the light receiving element 3. Therefore, if plural three-dimensional objects 1 are the same in quality and shape and if the light emitting element 2, light receiving element 3 and three-dimensional object 1 are in a fixed positional relation to one another, the reflected light intensity in the light receiving element 3 is always constant. Generally, the reflected light intensity changes if the quality or shape of the three-dimensional object 1 changes. Thus, the reflected light intensity can be used for discriminating whether plural three-dimensional objects are the same or not.

A brief description will be given below about the number of the light emitting element 2 and light receiving element 3 used in the three-dimensional object identifying system and also about the identification accuracy for the three-dimensional object.

In the case where only one light emitting element 2 and one light receiving element 3 are used, three-dimensional objects can be recognized as being different if reflected light intensities detected are different. But in the case where reflected light intensities detected are the same, it may be impossible to conclude that the three-dimensional objects concerned are the same. Thus, three-dimensional object identifying accuracy is not so high.

On the other hand, if plural light emitting elements 2 are disposed at different positions, a plurality of light rays, which are different in direction and distance, are radiated to the three-dimensional object 1. Therefore, by separating the reflected light intensity received in the light receiving element 3 into reflected light intensities corresponding to the light rays emitted from the light emitting elements 2, it is possible to obtain plural kinds of reflected light intensities defined, for example, by the shape of the three-dimensional object and thus the identification accuracy for the same object can be improved.

If a plurality of light receiving elements 3 are disposed at different positions, reflected light from the three-dimensional object 1 can be detected in different directions and distances, so it is possible to obtain a plurality of reflected light intensities defined, for example, by the shape of the three-dimensional object, whereby the identification accuracy for the same object can be improved. Further, if a plurality of light emitting elements 2 and a plurality of light receiving elements 3 are arranged at different positions, a still larger number of reflected light intensities can be obtained on the basis of a combination of such plural light emitting elements 2 and light receiving elements 3, thus making it possible to further improve the identification accuracy for the three-dimensional object.

Although the larger the number of the light emitting element 2 and light receiving elements 3, the greater can be improved the identification accuracy, this causes an increase in the volume of identifying processing, so it is desirable to set the number of the light emitting element 2 and that of the light receiving element 3 each in the range of about 2 to 10. In this case, the number of light emitting elements 2 and that of light receiving elements 3 are not always required to be the same.

Referring now to FIG. 2, there is shown a layout example of plural light emitting elements 2 and plural light receiving elements 3. In the same figure, the light emitting elements 2 are representedbywhite circles and the light receiving elements 3 by black circles.

Figure 2A:
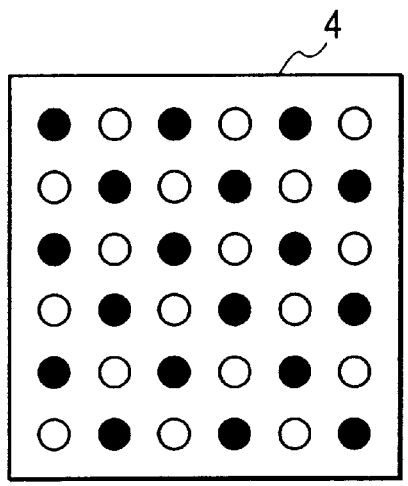
FIGS. 2A–2D, is a diagram showing layout examples of light emitting elements and light receiving elements both used in the three-dimensional object identifying system.
Figure 2B:
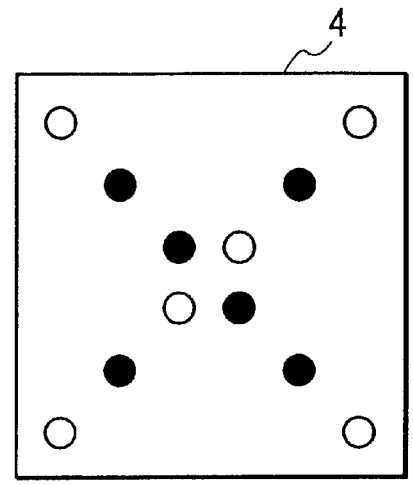
Figure 2C:
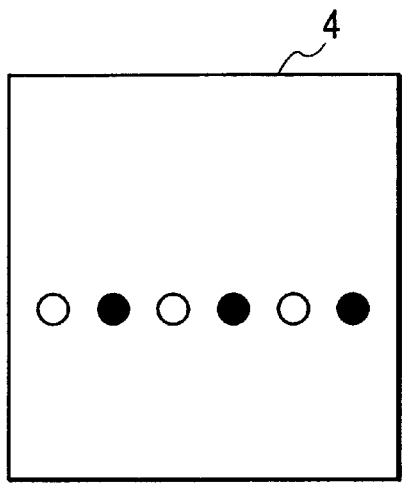
Figure 2D:
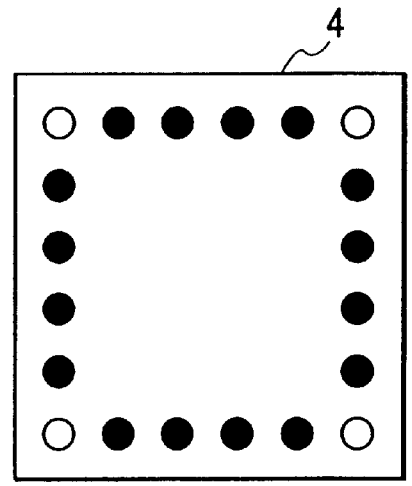

FIG. 2A shows an example in which light emitting elements 2 and light receiving elements 3 are arranged on a flat plate 4 alternately in both longitudinal and transverse directions. FIG. 2B shows an example in which light emitting elements 2 and light receiving elements 3 are arranged in X shape. FIG. 2C shows an example in which light emitting elements 2 and light receiving elements 3 are arranged in a rectilinear fashion. And FIG. 2D shows an example in which light emitting elements 2 and light receiving elements 4 are arranged in such a manner that the light emitting elements 2 are positioned at the four corners of a square shape.

The arrangement of the light emitting elements 2 and light receiving elements 3 is not limited to those shown in FIG. 2, but both elements may be arranged in various shapes, according to, for example, the position where the three-dimensional object to be detected is placed. Neither elements need always be arranged on the flat plate 4, but may be arranged on a curved plate or on the surface of a three-dimensional body.

Figure 3:
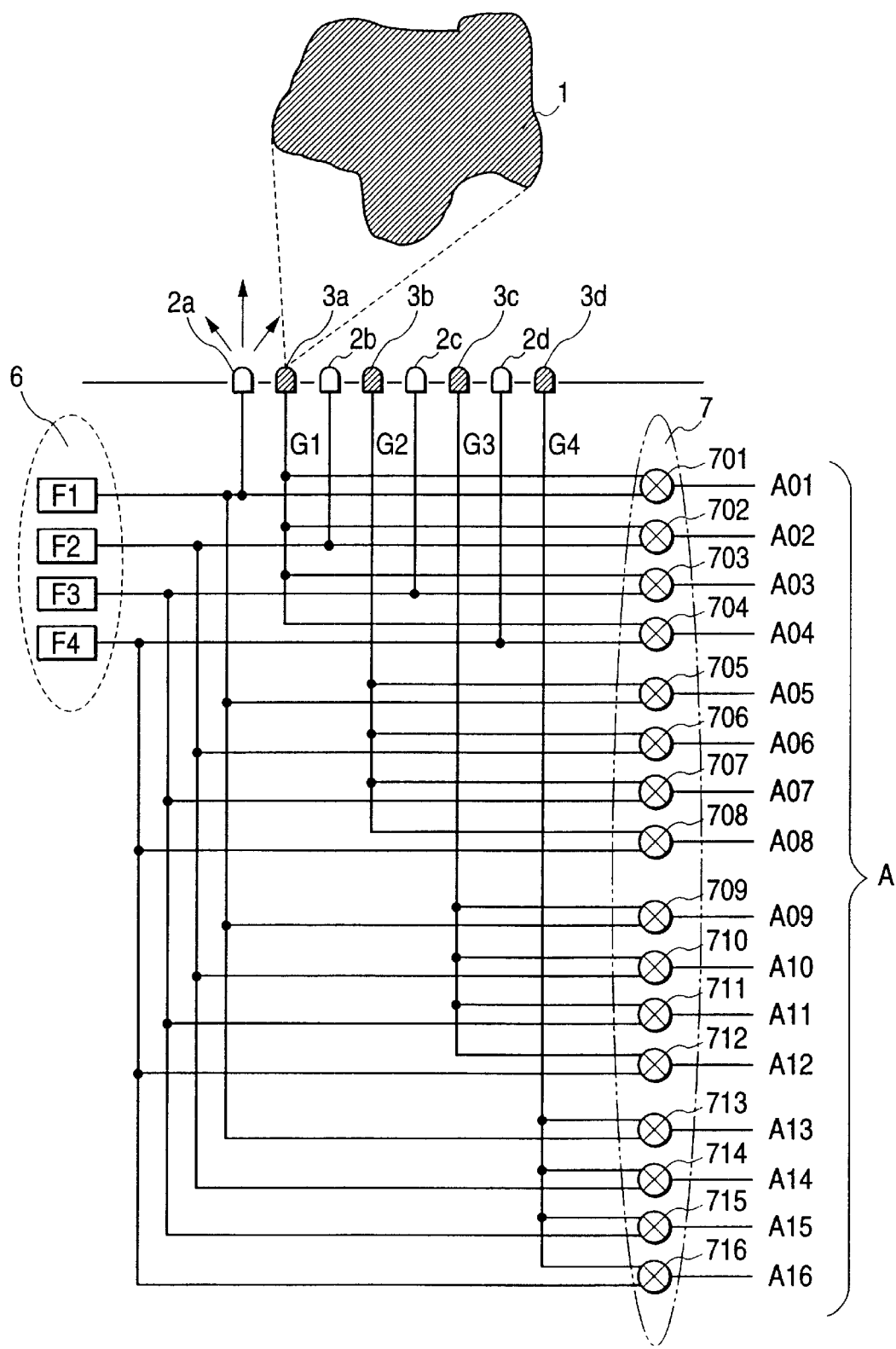
FIG. 3 is a diagram showing schematically an interior configuration of the three-dimensional object identifying system.

A description will now be directed to a partial schematic configuration of the interior of the three-dimensional object identifying system with reference to FIG. 3.

The three-dimensional object identifying system is provided with a function generating unit 6 having M number of function generators which generate M number (four in FIG. 3) of output signals (modulation signals) F1 to F4; M number of light emitting elements 2a to 2d which emit light in accordance with the M number of modulation signals respectively; N number (four in FIG. 3) of light receiving elements 3a to 3d; and a correlation detecting unit 7 having M×N=S number (sixteen in FIG. 3) of correlation detectors 701 to 716.

M number of modulation signals F1, F2, F3 and F4 outputted from the function generators in the function generating unit 6 are inputted respectively to different light emitting elements 2a, 2b, 2c and 2d and are each inputted to one input terminals of N number of correlation detectors. Detection signals G1, G2, G3 and G4 outputted from M number of light receiving elements 3a to 3d are each inputted to the other input terminals of M number of correlation detectors to one input terminals of which are inputted different modulation signals.

As to the output signal F1, this signal is inputted to the light emitting element 2*a* and is also inputted to input terminals on one side of the correlation detectors 701, 705, 709 and 713 of which the detection signals G1, G2, G3 and G4 outputted from the light receiving elements 3*a*, 3*b*, 3*c* and 3*d* are inputted to input terminals on the other side.

Likewise, the output signal F2 is inputted to the light emitting element 2*b* and is also inputted to one input terminals of the correlation detectors 702, 706, 710 and 714; the output signal F3 is inputted to the light emitting element 2*c* and is also inputted to one input terminals of the correlation detectors 703, 707, 711 and 715; and the output signal F4 is inputted to the light emitting element 2*d* and is also inputted to one input terminals of the correlation detectors 704, 708, 712 and 716.

In accordance with the thus-inputted detection signals and modulation signals the S number of correlation detectors 701 to 716 detect reflected light intensities (correlation information pieces) A01 to A16 of reflected lights from the three-dimensional object received by the light receiving elements which outputted the detection signals after irradiation from the light emitting elements, the light emitting elements emitting light on the basis of the modulation signals. For example, the correlation detector 701 detects the reflected light intensity A01 of reflected light from the three-dimensional object received by the light receiving element 3*a* after irradiation from the light emitting element 2*a*.

A brief description will be given below about the processing performed by the correlation detectors.

In one light receiving element, reflected lights of lights emitted from a plurality of different light emitting elements are detected in a superimposed state, and also as to extraneous lights other than such reflected lights, such as illumination lights, are superimposed and a detection signal is detected.

Each correlation detector determines a correlation between a modulation signal obtained by modulating the light from a light emitting element and a detection signal provided from a light receiving element and thereby separates only a reflected light component, i.e., a reflected light intensity, of light emitted from one light emitting element, from the detection signal containing plural reflected lights and extraneous lights in a superimposed state.

The correlation detecting unit 7 outputs S number of reflected light intensities A01 to A16 detected by the correlation detectors 701 to 716, as an S-dimensional vector, to an identifying unit 8 which will be described later. If the values of S number of reflected light intensities thus obtained are assumed to be an S-dimensional vector A, the vector A is determined by the surface quality and shape of a three-dimensional object.

As to the plural modulation signals generated by the function generators in the function generating unit 6, it is required that the reflected light intensity of light emitted from one light emitting element be capable of being separated from the detection signals in the light receiving elements 3*a* to 3*d*, and thus it is required that a cross correlation value of modulation signals be approximate zero. The cross correlation value represents the similarity of two signals with respect to in what manner values appear at various time points. Given that functions of two modulation signals are x(t) and y(t), the cross correlation value, $r_{xy}$, is represented as follows:

$$r_{xy} = \int_{t=0}^{\infty} x(t)y(t)dt$$

In order that an extraneous light of little change such as an illumination light or the sunlight may be separated appropriately by cut-off of a DC component through a capacitor in a detection circuit which will be described later, it is desirable that a DC component be not contained in each modulation signal. A modulation signal containing a large proportion of a DC component may cause a waveform distortion as a result of cutting off the DC component by the capacitor, and in this case it may be impossible to attain a high identification accuracy for a three-dimensional object. Further, an extraneous light noise such as an illumination light or computer display noise is in many cases a flashing signal in a CRT (Cathode-Ray Tube), and for eliminating the influence of such an extraneous noise it is necessary that the modulation signals adopted in the present invention be not correlated with flashing of the noise.

As plural modulation signals there may be used, for example, plural dipulse train signals of different timings, a plurality of trigonometric function signals of different periods, a plurality of trigonometric function signals of the same period but 90° out of phase, a plurality of burst sine wave signals of different timings, a plurality of pseudo noise code (PN code) signals of different timings, a plurality of M sequence code signals taken out from taps of a single M sequence generator, or a plurality of orthogonal code signals of approximately zero in terms of a cross correlation value.

Figure 4:
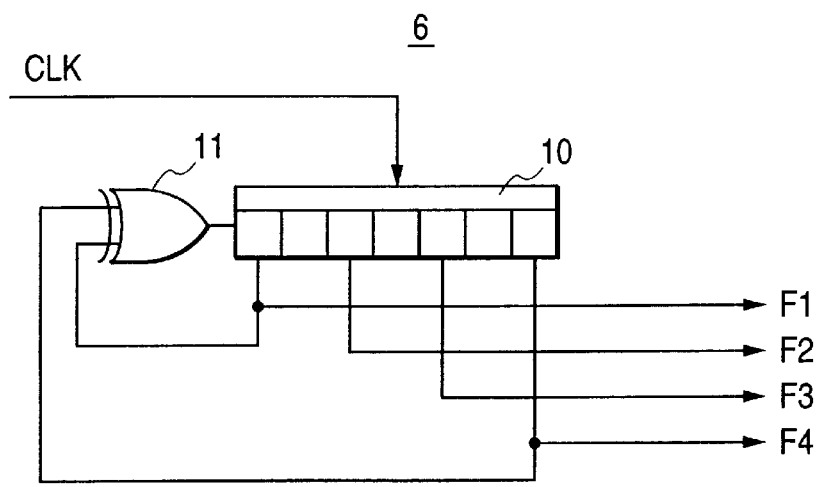
FIG. 4 is a diagram showing an example of a function generating unit used in the three-dimensional object identifying system.

FIG. 4 shows an example of the function generating unit 6 which outputsMsequence codes as pseudo noise codes. An output from a gate of an exclusive OR (EXOR) circuit 11 is inputted to a 7-bit shift register 10, while the values of first and seventh bits in the shift register 10 are inputted to the exclusive OR circuit 11. Further, a clock (CLK) signal is inputted to the shift register 10 and the value of each bit shifts rightward in accordance with the CLK signal. In this function generating unit it is possible to generate a pseudo noise signal with a 128-minus-one-bit, i.e., 127-bit, period. Therefore, output signals from the constituent bits of the shift register 10 are zero in terms of a cross correlation value.

In an output logic signal, the ratio of logic value 1 to logic value 0 is 64:63 and thus in a signal with logic value 1 set equal to +1 and logic value 0 equal to −1 the proportion of a DC component is approximately zero. That is, a waveform distortion will not occur even if the DC component is cut off.

Further, since there is no correlation with flashing of an extraneous light noise such as a fluorescent lamp or a CRT, the extraneous light noise does not exert any influence.

Thus, in the case where an M series code signal is adopted for a modulation signal, there is little influence of an extraneous light, so even if a bright illumination light or a flashing illumination light such as the light from a fluorescent lamp is radiated to a three-dimensional object to be identified, no influence is exerted on the identification of the three-dimensional object, nor is there any influence of a fast flashing interference light as in a CRT.

In the case where the number of light emitting elements is M and if an out-of-phase margin is taken into consideration, the foregoing modulation signals F1, F2, F3 and F4 can be obtained by the outputs from every other bits, as shown in FIG. 4.

Figure 5:
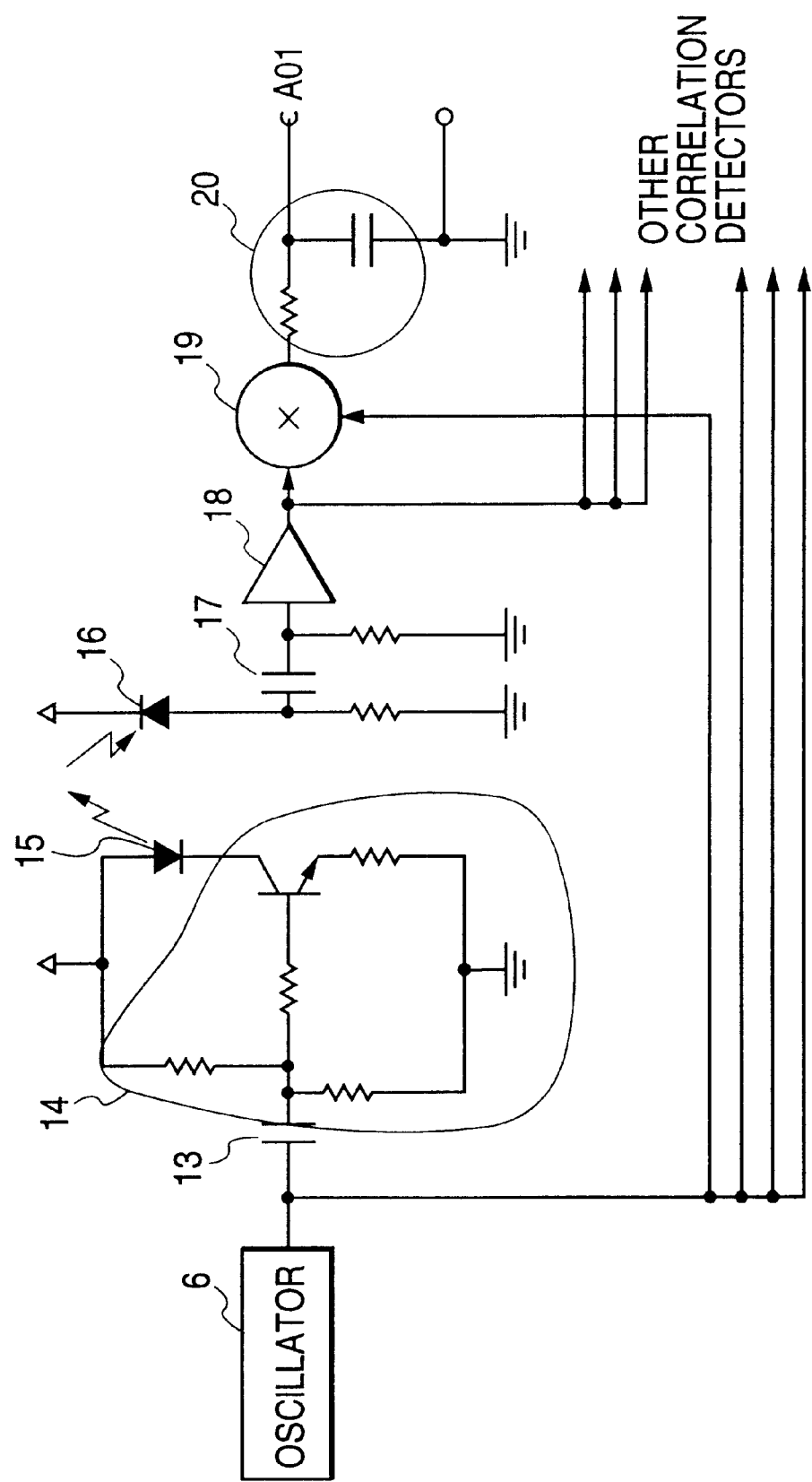
FIG. 5 is a diagram showing an example of an interior circuit configuration of the three-dimensional object identifying system.

FIG. 5 shows an example in which the interior configuration shown in FIG. 3 is obtained by a circuit using light emitting diodes 15 as the light emitting elements 2*a* to 2*d* and photodiodes 16 as the light receiving elements 3*a* to 3*d*.

In FIG. 5 there is shown a circuit portion of mainly one light emitting diode 15 and one photodiode 16, with the other light emitting diodes and photodiodes being omitted. The output of the oscillator (function generating section) 6, after cut-off of its DC component by the capacitor 13, is amplified by an amplifier 14 which includes a transistor and the amplified output is applied to the light emitting diode 15. The light radiated from the light emitting diode 15 is modulated by the output of the oscillator 6. In this circuit, the output of the oscillator 6 is an analog signal, but if the oscillator output is a digital signal as in FIG. 4, the start current in the light emitting diode should be turned ON and OFF with a logic value (1 or 0) of the signal. In this case, the light emitting diode can be driven by connecting a commercially available drive logic IC directly to the light emitting diode which is equipped with a current limiting resistor.

The output of the oscillator 6 is connected to a correlation detector 19 and also connected to other correlation detectors (not shown). A detection signal outputted from the photodiode 16 which has received reflected light from a three-dimensional object is cut off its DC component by means of a capacitor 17. As a result, the light component based on illumination or extraneous light is removed from the detection signal and the detection signal does not go over the input range of the amplifier 18. The amplifier 18 amplifies the detection signal provided from the photodiode 16 after removal of the DC component and outputs the amplified signal not only to the correlation detector 19 but also to other correlation detectors (not shown). The output of the correlation detector 19 is integrated by a CR integration circuit 20 and becomes one element A01 of the reflected light intensity (correlation information).

Thus, the interior configuration shown in FIG. 3 can be implemented by such a circuit as shown in FIG. 5 which can be simplified in structure and reduced in size.

If analog four-quadrant multipliers, say, MC1495 (a product of Motorola), are used as the correlation detectors in the correlation detecting unit 7, there will be obtained a satisfactory performance. If the output of such an oscillator 6 as shown in FIG. 4 is a digital signal, the correlation detector shown in FIG. 6 can be used as each correlation detector in the correlation detecting unit 7.

Figure 6:
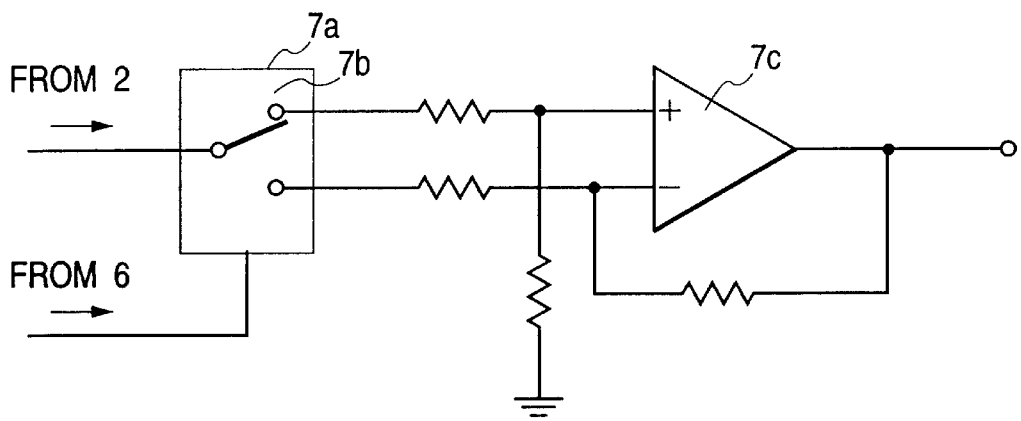
FIG. 6 is a diagram showing an example of a correlation detector used in the three-dimensional object identifying system.
Figure 7:
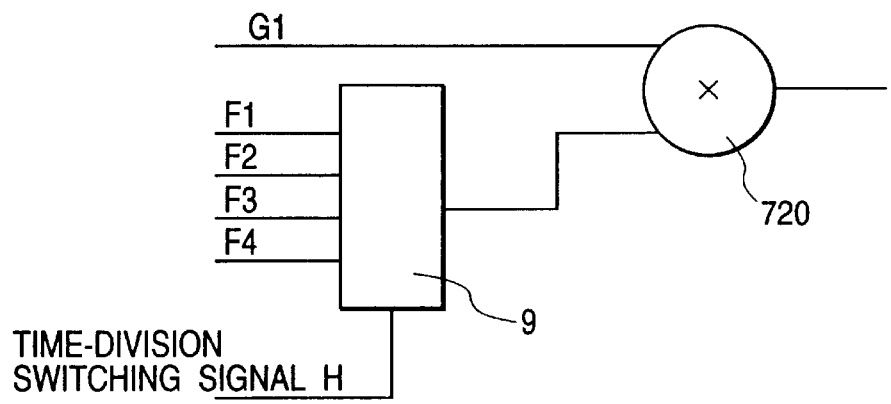
FIG. 7 is a diagram showing an example of a correlation detecting unit used in the three-dimensional object identifying system.

In the correlation detector shown in FIG. 6, a switching portion 7a changes over an analog switch 7b from one position to the other in accordance with a logic value (1 or 0) of a modulation signal inputted as a digital signal from the oscillator 6 and outputs a detection signal as an analog signal detected by a light receiving element 2 to either an inversional input terminal or a non-inversional input terminal of an operational amplifier 7c. According to this correlation detector, a signal based on the correlation between the digital modulation signal and the analog detection signal is outputted from the operational amplifier 7c. The signal outputted from the operational amplifier 7c is integrated into a reflected light intensity by means of an integrator (not shown). The circuit configuration of this correlation detector is simple and less expensive, permitting easy integration.

As noted previously, M×N=S number of correlation detectors are required in the correlation detecting unit 7, assuming that there are used M number of light emitting elements and N number of light receiving elements. Although sixteen correlation detectors are used in FIG. 3, the number of correlation detectors can be reduced by providing a multiplexer in an input portion of a correlation detector 7 and thus using one correlation detector in a time-sharing manner. For example, instead of correlation detectors 701, 702, 703 and 704 shown in FIG. 3, if a multiplexer 9 is provided in an input portion of a correlation detector 720 and the modulation signals F1, F2, F3 and F4 are switched over successively from one to another in accordance with a time-division switching signal H, it is possible to let one correlation detector 720 perform operations of four such detectors. If the correlation detector 720 is connected as in FIG. 7, the correlation detecting unit 7 which has required sixteen correlation detectors in the configuration of FIG. 3 now requires only four correlation detectors 720 and four multiplexers 9, thus contributing to the simplification of the circuit.

Although it has been described above that M×N=S number of correlation detectors are required in the correlation detecting unit 7, the number can be reduced according to a required three-dimensional object identifying ability. As a result, it is possible to reduce the number of correlation detectors and reduce the cost. In addition, since the number of dimensions of the vector A outputted from the correlation detecting unit 7 becomes smaller, it is possible to diminish the scale of the identifying section which will be described later and hence possible to attain the reduction of cost.

Figure 8:
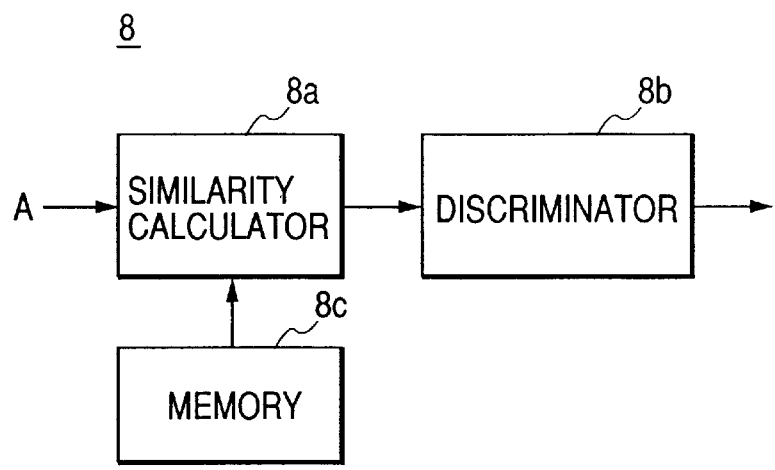
FIG. 8 is a diagram showing the configuration of an identifying section used in the three-dimensional object identifying system.

Next, the configuration of the identifying unit 8 used in the three-dimensional object identifying system will be described below with reference to FIG. 8.

Vector A outputted from the correlation detecting unit 7 and three-dimensional object information pre-cataloged in a memory 8c are inputted to a similarity calculator 8a, which in turn calculates a similarity on the basis of the inputted vector A and cataloged three-dimensional object information. On the basis of the similarity thus calculated a discriminator 8b performs identifying processing to be described later with respect to the three-dimensional object to be identified and then outputs the result of the identification.

The three-dimensional object information cataloged in the memory 8c can be updated at an appropriate timing to cope with a long-term change in shape of the object to be identified.

An example of the identifying processing carried out by the identifying unit 8 in the three-dimensional object identifying system will be described in detail below with reference to FIG. 9.

A description will be given first of the case where vector A on an S-dimensional vector space which includes reflected light intensities detected by S number of correlation detectors in the correlation detecting unit 7 is inputted to the identifying unit 8. A three-dimensional object set P represents a set of three-dimensional objects and P1, P2, . . . each represents a three-dimensional object. A cataloged vector set B is a vector set corresponding to the three-dimensional object set P, and B1, B2, . . . each represents a vector corresponding to the three-dimensional object. The cataloged vector set B is a set of vectors on an S-dimensional vector space and is stored in the memory 8c.

Figure 9:
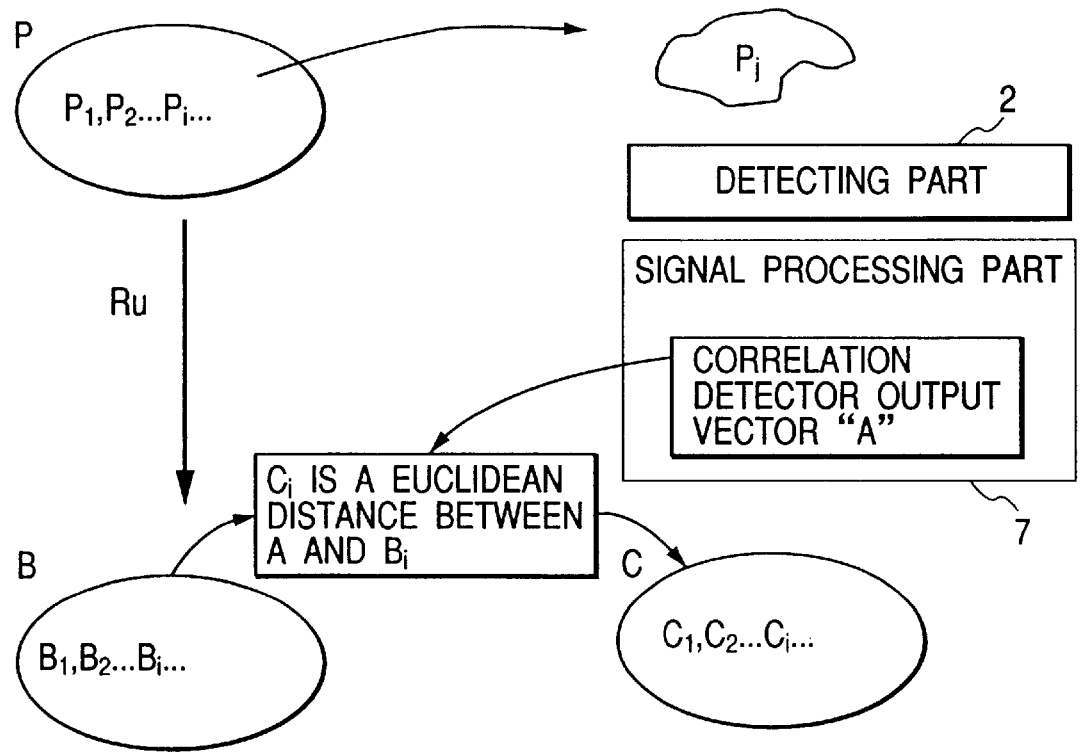
FIG. 9 is a diagram showing an example of processing carried out in the identifying unit.

The cataloged vector set B is obtained by processing Ru which is indicated with an arrow in FIG. 9.

In the processing Ru, with respect to a three-dimensional object Pi as an element of the three-dimensional object set P which is cataloged beforehand for identification, light is radiated and a vector including as components a plurality of reflected light intensities is detected from the correlation detecting unit 7 in the same way as in the processing for the detection of vector A, and the vector thus obtained is stored as element Bi in the memory 8c. The processing Ru may be carried out in such a manner that vectors are detected plural times by the correlation detecting unit 7 in the same way as in the vector A detecting processing and a mean value vector of the vectors thus obtained is stored as element Bi in the memory 8c. Further, to cope with a long-term change in shape of the cataloged object to be identified, the processing Ru may be re-executed at appropriate timing to update the vector Bi which is cataloged information. In this processing Ru, as to the vector A to be used, there may be used a vector A detected in an actual identifying operation which will be described later.

For discriminating to which of the three-dimensional objects as elements of the three-dimensional object set P the three-dimensional object Pj to be identified corresponds, the similarity calculator 8a calculates as similarity a Euclidean distance Ci in an S-dimensional space between the vector A from the correlation detecting unit 7 obtained by radiating light to the three-dimensional object to be identified and all the elements Bi of the cataloged vector set B and uses it as an element of a similarity set C. There exists the relation of Ci=|A−Bi|. The similarity calculator 8a outputs the similarity set C to the discriminator 8b.

For discriminating whether or not the three-dimensional object Pi as one element of the three-dimensional object set P and the three-dimensional object Pj to be identified are the same, the similarity calculator 8a calculates as similarity a Euclidean distance Ci in an S-dimensional space between the vector A from the correlation detecting unit 7 obtained by radiating light to the three-dimensional object to be identified and the element Bi corresponding to the three-dimensional object Pi and then outputs it to the discriminator 8b. Here also there exists the relation of Ci=|A−Bi|.

For discriminating to which of the three-dimensional objects as elements of the three-dimensional object set P the three-dimensional object Pj to be identified corresponds, the discriminator 8b selects from the similarity set C an element Ck of a value which indicates the closest similarity, and issues a judgment result to the effect that the three-dimensional object Pk corresponding to the element Ck corresponds to the three-dimensional object Pj to be identified. Since the element Ci in the similarity set C is a Euclidean distance, the smaller the value, the closer in similarity. If elements of the same value are included in the similarity set C and if they indicate the closest similarity, light is again radiated to the three-dimensional object to be identified and the similarity set C is re-calculated on the basis of the resulting vector A from the correlation detecting unit 7. In discriminating whether or not the three-dimensional object Pi as one element in the three-dimensional object set P and the three-dimensional object Pj to be identified are the same, the discriminator 8b judges that both are the "same" if the value of similarity indicates a closer similarity than a predetermined threshold value, while it judges that both are "not the same" if the value of similarity indicates being less similar than the threshold value, then the discriminator outputs the judgment result. If the similarity is of the same value as the threshold value, it is possible to again radiate light to the three-dimensional object to be identified, then newly calculate a similarity on the basis of the resulting vector A from the correlation detecting unit 7, and output a judgment result.

Thus, the use of a Euclidean distance as similarity permits the application of a relatively simple processing to identify a three-dimensional object.

Another example of an identifying processing carried out by the identifying unit 8 will be described below with reference to FIG. 10.

Figure 10:
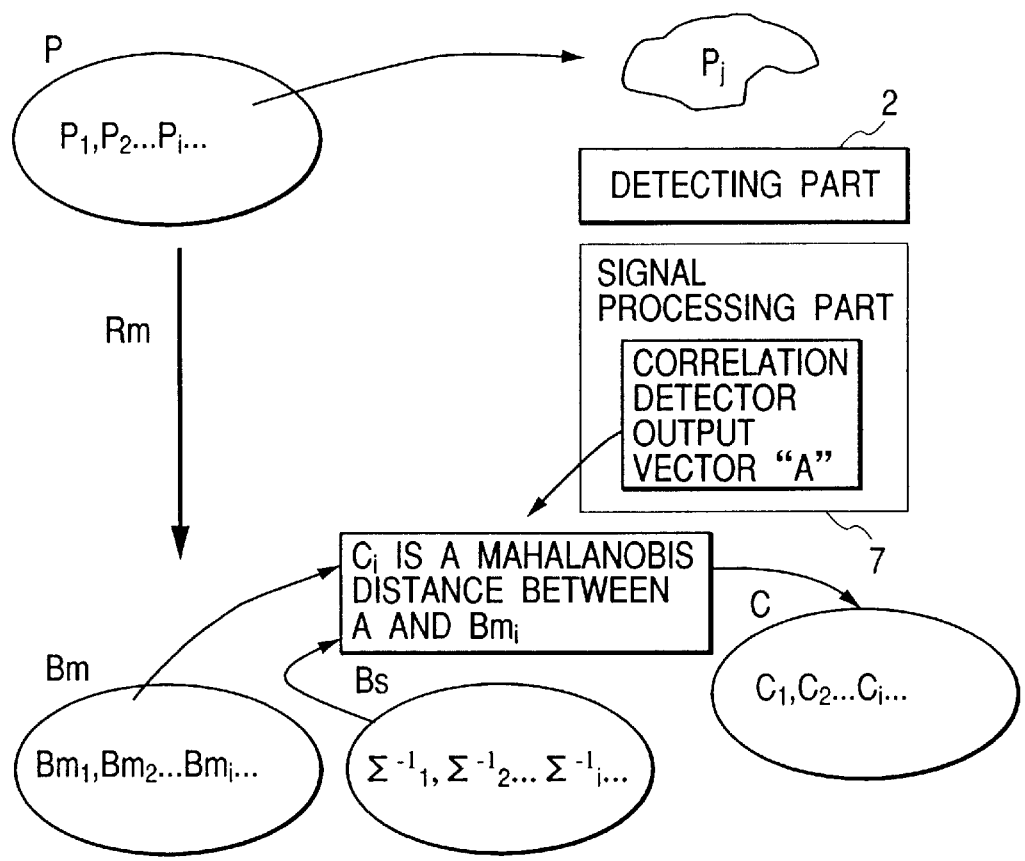
FIG. 10 is a diagram showing another example of processing carried out in the identifying unit.

In the processing Rm indicated with an arrow in FIG. 10, with respect to a three-dimensional object Pi as an element of a three-dimensional object set P which is cataloged in advance, light is radiated and vectors outputted from the correlation detecting unit 7 are obtained plural times, then a mean value vector Bmi is determined from the plural vectors. A set of such mean value vectors is assumed to be Bm. Further, a variance-covariance matrix $\Sigma i$ relating to the above plural vectors is obtained and there is determined an inverse matrix $\Sigma i^{-1}$ of the variance-covariance matrix $\Sigma i$. A set which comprises this inverse matrix as element is assumed to be Bs. Then, the two sets Bm and Bs are stored in the memory 8c. Moreover, in order to cope with a long-term change in shape of a cataloged object to be identified, the processing Rm may be re-executed at appropriate timing to update the mean value vector Bmi and the inverse matrix $\Sigma i^{-1}$ of the variance-covariance matrix $\Sigma i$ which are cataloged information pieces. In this processing Rm, as to the vector A to be used, there maybe used a vector A detected in an actual identifying operation which will be described later.

For discriminating to which three-dimensional object as an element of the three-dimensional object set P the three-dimensional object to be identified corresponds, the similarity calculator 8a uses the output vector A from the correlation detecting unit 7 as a row vector, then calls from the memory 8c each element Bmi and inverse matrix $\Sigma i^{-1}$ of the sets Bm and Bs, which corresponds to the three-dimensional object Pi as an element of the three-dimensional object set P, and calculates a Mahalanobis distance Ci as similarity and as an element of the similarity set C. The Mahalanobis distance Ci is given as:

$$Ci=(A-Bmi)\Sigma i^{-1}(A-Bmi)^T [T\text{:transposition}]$$

The similarity calculator 8a makes calculation for all the elements contained in the sets Bm and Bs to determine the similarity set C and outputs the set C to the discriminator 8b.

For discriminating whether or not the three-dimensional object Pi as one element in the three-dimensional set P and the three-dimensional object to be identified are the same, the similarity calculator 8a calls from the memory 8c the element Bmi and inverse matrix $\Sigma i^{-1}$ corresponding to the three-dimensional object Pi, then calculates a Mahalanobis distance Ci as similarity, and outputs it to the discriminator 8b. The Mahalanobis distance Ci is given as follows:

$$Ci=(A-Bmi)\Sigma i^{-1}(A-Bmi)^T (T\text{:transposition})$$

For discriminating to which three-dimensional object as an element of the three-dimensional object set P the three-dimensional object to be identified corresponds, the discriminator 8b selects from the similarity set C an element Ck of a value which indicates the closest similarity, and issues a judgment result to the effect that the three-dimensional object Pk corresponding to the element Ck is the three-dimensional object to be identified. If elements of the same value are contained in the similarity set C and if they indicate the closest similarity, light is again radiated to the three-dimensional object to be identified and the discriminator 8b again calculates the similarity set C on the basis of the resulting vector A from the correlation detecting unit 7. Since the element Ci in the similarity set C is a Mahalanobis distance, the smaller the value is, the closer the similarity is. In discriminating whether or not the three-dimensional object Pi as one element in the three-dimensional object set P and the three-dimensional object to be identified are the same, the discriminator 8b judges that both are the "same" if the value of similarity indicates a closer similarity than a predetermined threshold value, while it judges that both are "not the same" if the value of similarity indicates being less similar than the threshold value, and outputs the result of the judgment. If the similarity is of the same value as the threshold value, light is again radiated to the three-dimensional object to be identified and the discriminator 8b newly calculates a similarity on the basis of the resulting vector A from the correlation detecting unit 7 and outputs a judgment result.

Thus, by using a Euclidean distance as similarity, a three-dimensional object can be identified by a relatively simple processing. If a Mahalanobis distance is used as similarity, components of vector A and the degree of dispersion between components, which are determined by a geometric positional relation of light emitting elements and light receiving elements to the three-dimensional object to be identified, can be normalized and therefore it is possible to give a more accurate decision of identification than in the case of using a Euclidean distance as similarity. Thus, there increases the degree of freedom in the positional relation of light emitting elements and light receiving elements to the three-dimensional object to be identified. In addition, in the case of mounting light emitting elements and light receiving elements in a user interface apparatus which comes into contact with a user, such as an information apparatus, they can be mounted in a portion not causing a sense of incongruity for the user, and therefore the user can operate the information apparatus comfortably.

Since the operation performed by the identifying unit 8 in the three-dimensional object identifying system is, more generally, a vector discriminating operation, there may also be adopted another method for the discrimination of vectors, such as a discrimination method which utilizes the angle to a reference vector or a discrimination method which utilizes a neural network.

Thus, according to the three-dimensional object identifying system of this embodiment, a three-dimensional object can be identified by a small-sized and simple configuration, and if a plurality of three-dimensional objects are cataloged, it is possible to discriminate to which of the cataloged three-dimensional objects the three-dimensional object to be identified corresponds. Further, it is possible to designate one of the cataloged three-dimensional objects and discriminate whether or not the three-dimensional object to be identified is the same as the thus-designated one.

For carrying out the identifying processing for a moving three-dimensional object in the above embodiment, information pieces such as vectors of the three-dimensional object are detected beforehand at predetermined time intervals while the three-dimensional object is moving, and are cataloged. By so doing, the three-dimensional object and the state of its movement can be recognized on the basis of such plural cataloged information pieces and information obtained from the three-dimensional object to be identified. At this time, the movement of the three-dimensional body to be identified can also be recognized by performing the identifying processing continuously for the three-dimensional object.

If part or the whole of the user's body is used as the three-dimensional object to be identified by the three-dimensional object identifying system, it is possible to discriminate whether or not the user is a legitimate user of an information apparatus such as a personal computer and hence possible to prevent illegitimate use by any other person than the legitimate user. Part of the user's body as the three-dimensional object to be identified is not specially limited insofar as it is a portion which permits detection in the light receiving elements of reflected lights of the lights emitted from the light emitting elements, such as the palm, finger, head, nose, or auricle.

In the above embodiment, if the member for accommodating the light emitting elements and the light receiving elements is made different from the other members which accommodate other components, it is possible to improve the degree of freedom in the mounting of the light emitting elements and the light receiving elements. Although the similarity detecting unit 7 can be implemented as an electronic circuit, if analog signals are digitized, the detecting section can be implemented using a digital signal processing program which is executed by a DSP (digital signal processor) or a general-purpose processor. The identifying unit 8 can be implemented as software in an information apparatus. Anyway, the configuration of each functional section can be determined realistically while taking into account the cost, easiness of design and limitations on the shape.

Figure 11:
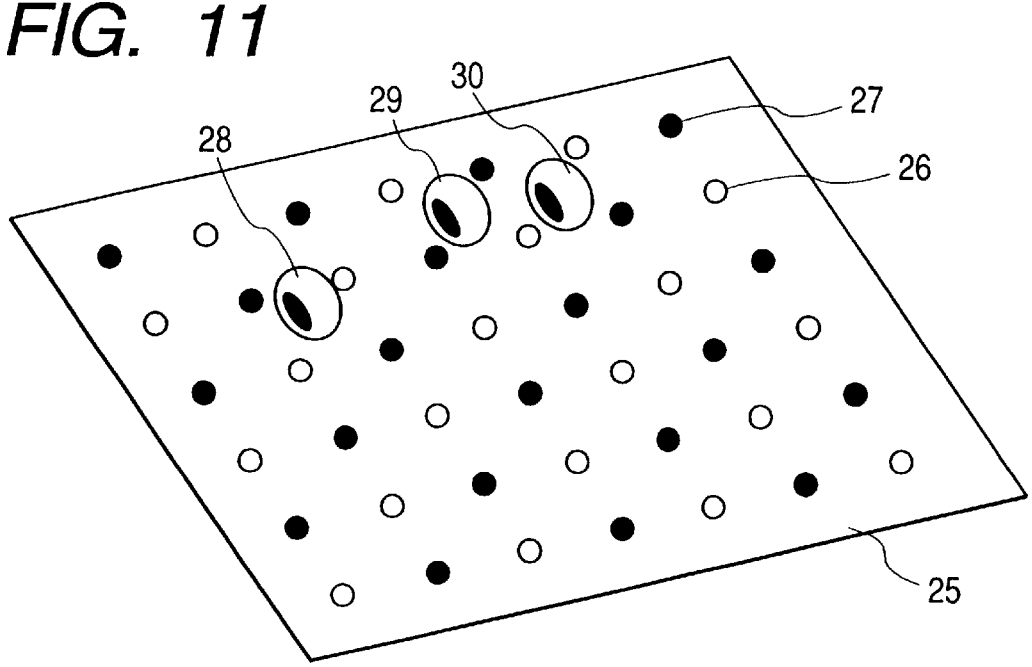
FIG. 11 is a diagram showing a member which accommodates therein light emitting elements and light receiving elements to be used for identifying the shape of a human right hand.

FIG. 11 shows a configuration example of a light emitting and receiving elements accommodating member in the three-dimensional object identifying system, which is used for identifying a human right-hand shape. In the same figure, white circles represent light emitting elements, while black circles represent light receiving elements.

Figure 12:
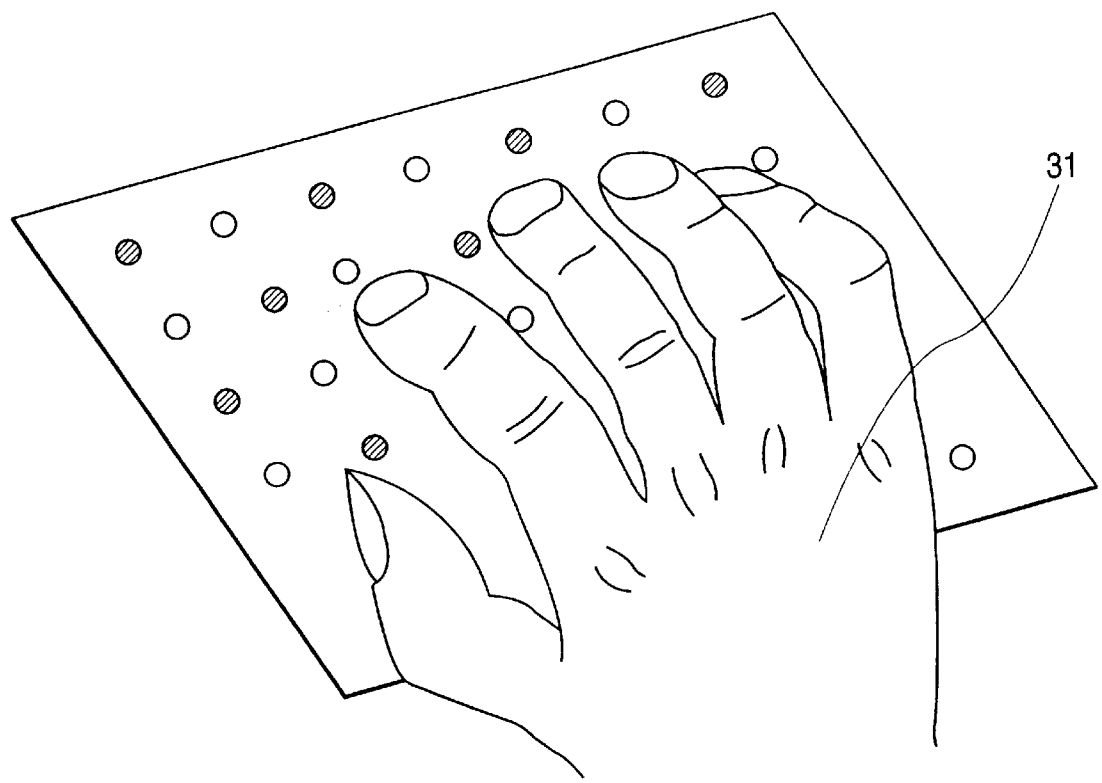
FIG. 12 is a diagram with the right hand put on the member shown in FIG. 11.

Plural light emitting diodes 26 and photodiodes 27 are arranged on a substrate 25 formed of metal or a plastic material in such a manner that a main light emitting direction and a main light receiving direction are perpendicular to the substrate 25. The substrate 25 has a depression 28 for the forefinger, a depression 29 for the middle finger, and a depression 30 for the ring finger. The depressions 28, 29 and 30 permit the user to put his or her right hand on the substrate 25 always at the same position and in the same state. FIG. 12 shows a state in which the user has put his or her right hand 31 on the substrate. Although this example is for identifying the shape of the right hand, the configuration for identifying the shape of the left hand can also be implemented in the same manner.

The following description is now provided about an example in which the light emitting elements and the light receiving elements used in the three-dimensional object identifying system are incorporated in a user interface device in an information apparatus.

Figure 13:
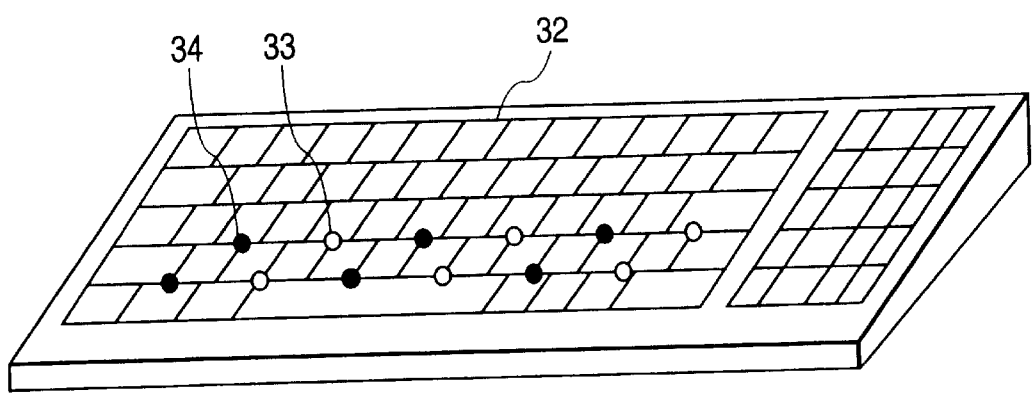
FIG. 13 is a diagram showing an example in which light emitting elements and light receiving elements used in the three-dimensional object identifying system have been mounted on a keyboard.

FIG. 13 shows an example in which the light emitting elements and light receiving elements of the three-dimensional object identifying system are mounted on a keyboard of an information apparatus. Plural light emitting diodes 33 and photodiodes 34 are embedded in key-to-key gaps on a keyboard body 32. Therefore, the user does not have a sense of incongruity during use of the keyboard.

In striking the keyboard, the user usually puts his or her fingers ata position called home position. If the keyboard, chair, desk and display are the same and their positional relation is also the same, the positions and angles of the fingers when put on the keyboard are almost constant as long as the user is the same. On the other hand, when another user puts his or her fingers on the keyboard, the size and shape of the fingers are different from those of the previous user, and the positions and angles of the fingers are also different even under the same operational environment. Thus, it is possible to identify each user on the basis of the user's fingers put on the keyboard.

In the three-dimensional object identifying system described above in connection with FIG. 13, the keyboard depressing timing and the input timing for three-dimensional shape data for identifying or data on identification are interlocked with each other in order to enhance the identification accuracy. In the key depressing operation, different hand shapes are observed according to users and therefore the identification accuracy is enhanced. For example, if the identifying system is constructed so that the shape of hand is identified as a three-dimensional object upon depression of a key "A" located at the leftmost end in the middle stage of an ordinary type of a keyboard, the motion of the user acts on identification, so that it becomes difficult for another user to make imitation.

Figure 14:
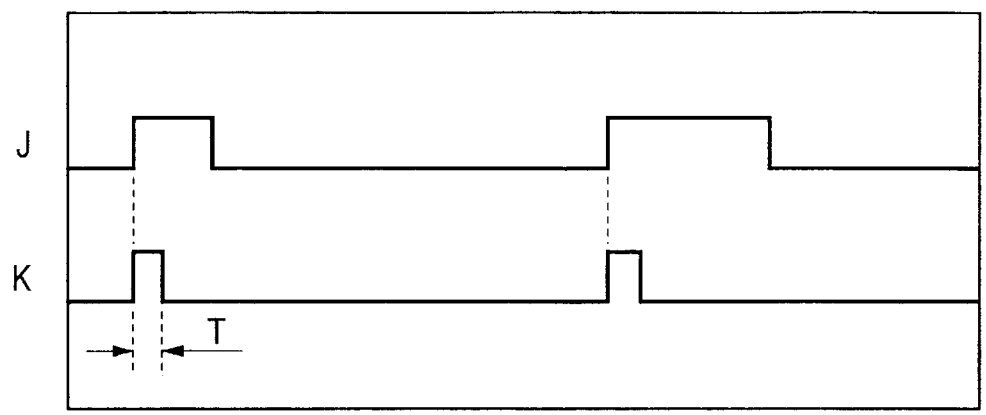
FIG. 14 is a diagram showing timing in connection with the example of FIG. 13.

In this connection, FIG. 14 shows a concrete timing. In the same figure, a logic signal J is a signal which goes high (H level) when a key on the keyboard is depressed and goes low (L level) in other cases, and a logic signal K is a signal which goes high while a key depressing finger on the keyboard is identified and goes low in other cases. Upon rising of the logic signal J, the logic signal K goes high for only a predetermined certain time interval T, during which identification is made on the basis of a three-dimensional shape of the key depressing finger on the keyboard. Actually, the vector A from the correlation detecting unit 7, the output waveform of the light emitting elements, or the similarity described above in connection with FIG. 8, is stored in memory temporarily, and using this stored data, a three-dimensional shape of the finger is identified. Alternatively, the state of identifying operation is retained and the result thereof is stored in a temporary memory when the logic signal K is at H level, and is later used as a final result. Anyway, a three-dimensional shape of a finger is grasped and identified in interlock with the depression of a key.

Figure 15:
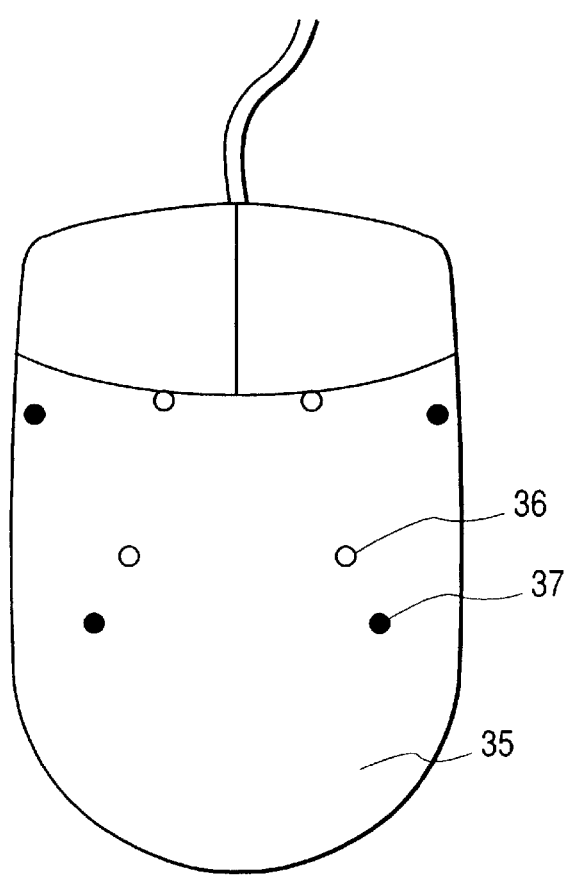
FIG. 15 is a diagram showing an example in which the light emitting elements and light receiving elements have been incorporated in a mouse.

FIG. 15 shows an example in which light emitting elements and light receiving elements used in the three-dimensional object identifying system are incorporated in a mouse which is used for inputting data to an information apparatus. Plural light emitting diodes 36 and photodiodes 37 are embedded in the upper portion of a mouse body 35. The same user grasps the mouse body 35 always at approximately constant angles and positions. Different users are different in the size and shape of hand and grasp the mouse at different finger positions and angles. Therefore, when a user grasps the mouse in an ordinary manner, it is possible to identify the user on the basis of his or her finger shape.

Figure 16:
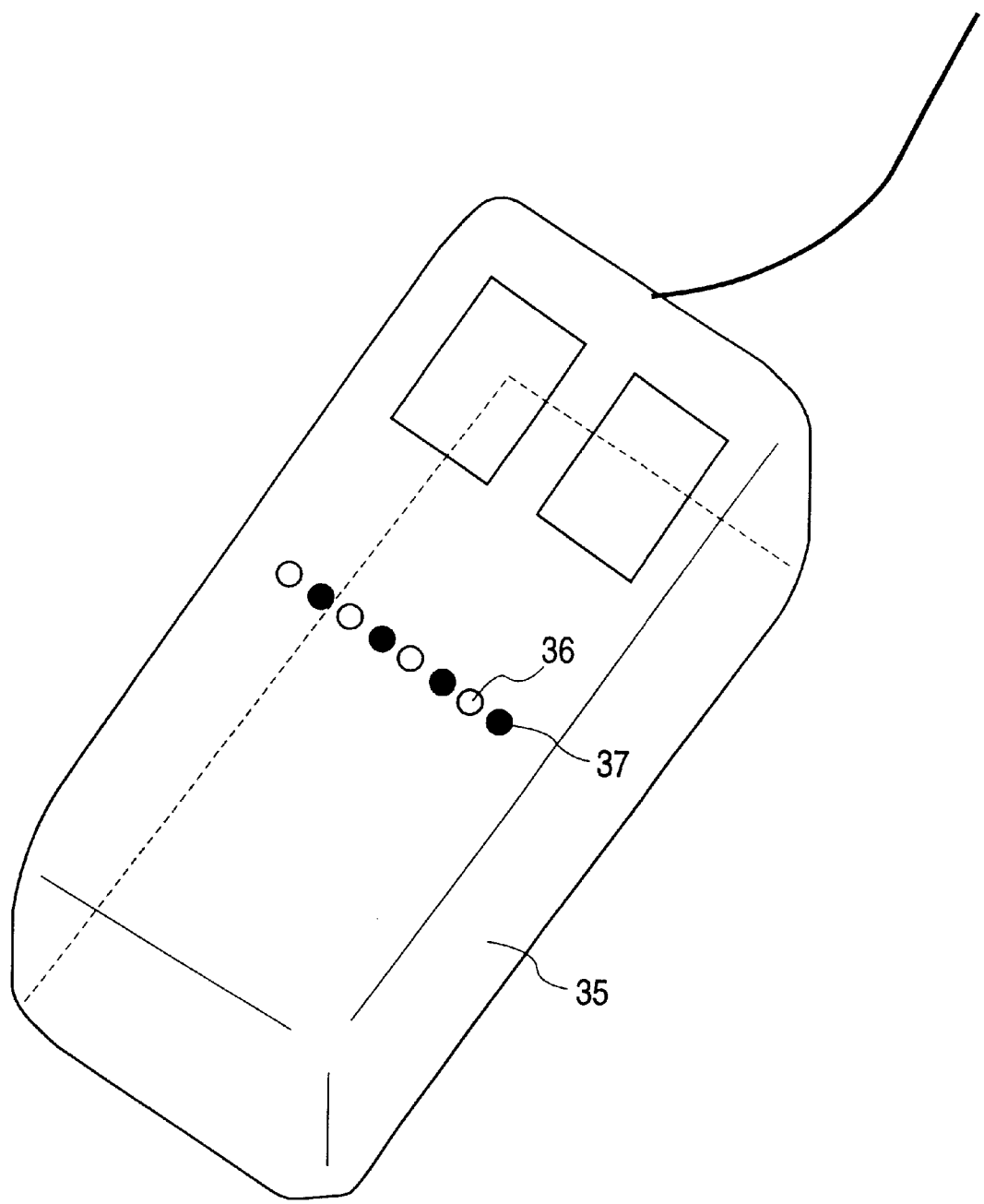
FIG. 16 is a diagram showing an modified example of a mouse with the light emitting elements and light receiving elements incorporated therein.

The light emitting diodes 36 and the photodiodes 37 are disposed in a three-dimensionally distributed manner in conformity with a curved shape of the mouse portion where the user puts his or her palm. But no limitation is made thereto. For example, there may be adopted such a configuration as shown in FIG. 16, in which light emitting diodes 36 and photodiodes 37 are arranged alternately in a one-dimensional form on a flat area of a mouse 35 on which the user puts his or her palm, the mouse 35 having a housing formed in the shape of a rectangular parallelepiped.

An individual identifying experiment was conducted with respect to the example shown in FIG. 15 and the following results were obtained. There was used an experimental system having the basic configuration shown in FIG. 3, including four infrared emitting diodes as light emitting elements and four photodiodes as light receiving elements. As a function generator there was used the function generator 6 of M sequence code shown in FIG. 4. A logic signal output is used to perform a modulating operation for turning on and off the infrared emitting diodes as light emitting elements. Correlation detectors each have the same detection system as that shown in FIG. 6. Further, a Mahalanobis distance is used as the similarity for use in the identifying processing.

Subjects in the experiment are six persons and the experiment was conducted under illumination using fluorescent lamps in an ordinary type of an office room. The mouse of the experimental system and the CRT display of the associated personal computer are in the normal positional relation to each other. Therefore, the personal computer, although it is an experimental system, looks to the subjects as if it were just the same as the ordinary type of a personal computer.

First, for the six subjects there is performed a cataloging operation for identification. In the cataloging operation, which corresponds to the processing Rm described previously in connection with FIG. 10, the subjects are each required to grasp the mouse twenty times, then output vectors from the correlation detecting unit 7 in a still condition of the subject's hand are detected, then a mean value vector thereof Bmi and a variance-covariance matrix $\Sigma i$ are obtained or each subject, and further an inverse matrix $\Sigma i^{-1}$ of the variance-covariance matrix $\Sigma i$ is obtained.

For the subjects, subject numbers are added as subscripts to mean value vectors and also to inverse matrices of variance-covariance matrices to obtain mean value vectors Bm1, Bm2, Bm3, Bm4, Bm5, Bm6 and inverse matrices $\Sigma 1^{-1}$, $\Sigma 2^{-1}$, $\Sigma 3^{-1}$, $\Sigma 4^{-1}$, $\Sigma 5^{-1}$, $\Sigma 6^{-1}$. These mean value vectors and inverse matrices related to the subjects are stored in memory.

Figure 17:
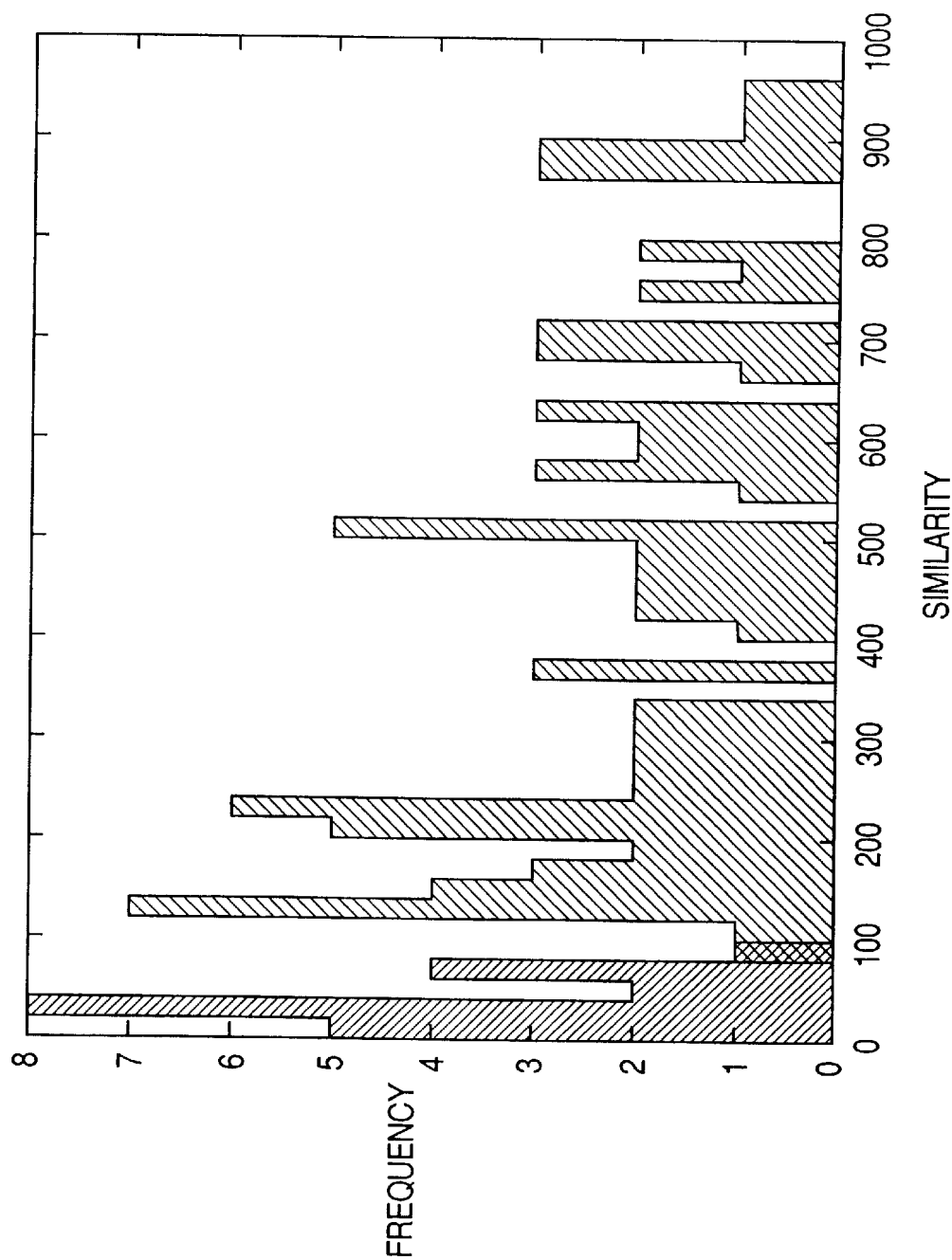
FIG. 17 is a histogram showing the results of having obtained similarity with respect to a sample of subject No. 1 and samples of other subjects.

An attempt was made as to whether or not the subject No. 1 could be identified by the other five subjects. Cataloged information pieces of the subject No. 1 are Bm1 and $\Sigma 1^{-1}$. Using these information pieces, a Mahalanobis distance of the associated sample is calculated and the value obtained is used as similarity. If this similarity value is smaller than a certain threshold value, the subject is identified to be the person concerned, while if it is larger than the threshold value, the subject is regarded to be another person. Each subject was required to perform a mouse grasping motion, then an output vector from the correlation detecting unit 7 was detected in a stopped state of the motion, and this detected output vector used as one sample to determine the similarity. FIG. 17 shows, as histogram, the results of having determined similarity with respect to the sample of subject No. 1 and samples of the other subjects. In the same figure, the sample bar of subject No. 1 is hatched rightward and downward, while the sample bars of the other subjects are hatched leftward and downward. Further, the portion where the sample of subject No. 1 and the samples of the other subjects overlap each other is hatched in the shape of an oblique cross lattice.

In this experiment, if the threshold value is assumed to be 80, there occurs an error such that even the person concerned is not so judged, and if the threshold value is assumed to be 100, there occurs an error such that another person is judged to be the person concerned. However, it is possible to make sure that most of the samples are identified correctly.

As to the threshold value, it can be set low to eliminate the error of taking another person for the person concerned. It is also possible to set the threshold value high for preventing the error of the person concerned being rejected. Anyway, the threshold value can be adjusted according to the purpose of identification.

Using this experimental system, an experiment was conducted to discriminate which of the six subjects was the person who grasped the mouse. Table 1 shows a similarity C1 based on cataloged information of the subject of subject No. 1 and similarities C2 to C6 based on cataloged information of subject Nos. 2 to 6.

TABLE 1

| Sample No. | C1 | C2 | C3 | C4 | C5 | C6 | Results |
|---|---|---|---|---|---|---|---|
| 1 | 28.7 | 1680 | 3140 | 376 | 2420 | 590 | correct |
| 2 | 17.5 | 2940 | 2300 | 347 | 3830 | 1200 | correct |
| 3 | 37.5 | 582 | 3920 | 191 | 1780 | 919 | correct |
| 4 | 23 | 1620 | 1880 | 204 | 2010 | 890 | correct |
| 5 | 76.2 | 1880 | 2410 | 217 | 1205 | 1260 | correct |

TABLE 1-continued

| Sample No. | C1 | C2 | C3 | C4 | C5 | C6 | Results |
|---|---|---|---|---|---|---|---|
| 6 | 11.4 | 2780 | 4170 | 155 | 1225 | 939 | correct |
| 7 | 40.8 | 2990 | 3532 | 60.2 | 1050 | 870 | correct |
| 8 | 78.9 | 494 | 4380 | 98.1 | 2410 | 588 | correct |
| 9 | 14.6 | 1190 | 3910 | 114 | 511 | 869 | correct |
| 10 | 13 | 2180 | 4720 | 292 | 1770 | 1760 | correct |
| 11 | 74.8 | 2060 | 4520 | 107 | 3120 | 827 | correct |
| 12 | 20.5 | 440 | 3080 | 191 | 9220 | 2050 | correct |
| 13 | 68.8 | 2030 | 3480 | 24.8 | 498 | 653 | error |
| 14 | 87.4 | 2320 | 2080 | 120 | 783 | 1050 | correct |
| 15 | 15.6 | 1420 | 3360 | 61.7 | 3530 | 1520 | correct |
| 16 | 34.8 | 1560 | 4120 | 67.6 | 1280 | 852 | correct |
| 17 | 31.9 | 1050 | 1980 | 309 | 3660 | 493 | correct |
| 18 | 31.8 | 2540 | 2770 | 175 | 1250 | 295 | correct |
| 19 | 47.9 | 1420 | 3400 | 473 | 470 | 1480 | correct |
| 20 | 31.5 | 1330 | 4110 | 106 | 2370 | 2610 | correct |

C1, C2, C3, C4, C5 and C6 are calculated for one sample and constitute a similarity set which has been described previously in connection with FIG. 10. Since this sample is concerned with the person of subject No. 1, the value of C1 indicates similarity in comparison with the other elements, and in this case, if the value is smaller than the values of the other elements, it follows that correct identification of subject was made. According to the results shown in this table, all the samples except sample No. 13 were identified correctly. As a result of having conducted the same experiment for identification as above for the other five subjects, the percent correct answer in identification was 97% with respect to all of the samples. For attaining a more accurate identification, if plural elements close in similarity to each other are included in the similarity set of one sample, it is possible to attain a percent correct answer of 100% by re-sampling for example.

Thus, according to this three-dimensional object identifying system, it is possible to discriminate whether or not the user who grasps the mouse is a legitimate user whose finger shape information in a mouse grasped state has been stored in advance. If such information on plural legitimate users has been stored, it is possible to discriminate which of the users is operating the mouse. Thus, by incorporating light emitting elements and light receiving elements in a mouse, it is made possible to form a judgment as to whether the user concerned is a legitimate user or not, with scarcely any sense of incongruity being given to the user.

When an instantaneous posture (including a partial shape of hand or finger) in a user's motion for input to an input device was detected, it turned out that a feature of the user appeared more stably than making the detection in a forcibly stopped state of that posture. That is, the state just after the stop of mouse movement for pointer movement on the display or the state just after a mouse clicking motion is smaller in dispersion among individuals than the mouse grasping finger shape, thus affording shape data in a relatively stable manner. Consequently, the difference in characteristic features among users becomes clear, whereby the individual identifying capability can be further enhanced.

As to the example of the mouse shown in FIG. 15, in order to attain a further improvement of the individual identifying accuracy, it is preferable that the shape of the user's mouse grasping fingers be in the same positional relation stably to the mouse. To this end, clicking of the mouse and the timing of inputting three-dimensional shape data for identification or data on identification are interlocked with each other. More particularly, the mouse grasping finger shape changes with movement or clicking of the mouse. For example, however, when a button displayed on the display is to be pushed, the mouse grasping finger shape and the mouse assume the same positional relation stably just after movement of the mouse pointer on the display onto the button and just before clicking the mouse. At this time, a three-dimensional shape of the fingers is identified. To be more specific, vector A from the correlation detecting section, output waveform of the light receiving elements, or the similarity described previously in connection with FIG. 8, all of which serve as three-dimensional shape data, is stored in memory temporarily, and using the thus-stored three-dimensional shape data, there is made identification of the three-dimensional finger shape. Further, the system is maintained in a state of identifying operation, and at the aforesaid three-dimensional shape data input timing the result of identification is stored in a temporary memory, then is later used as a final result. Anyway, a three-dimensional finger shape is grasped in interlock with click detection and is used for identification.

Figure 18:
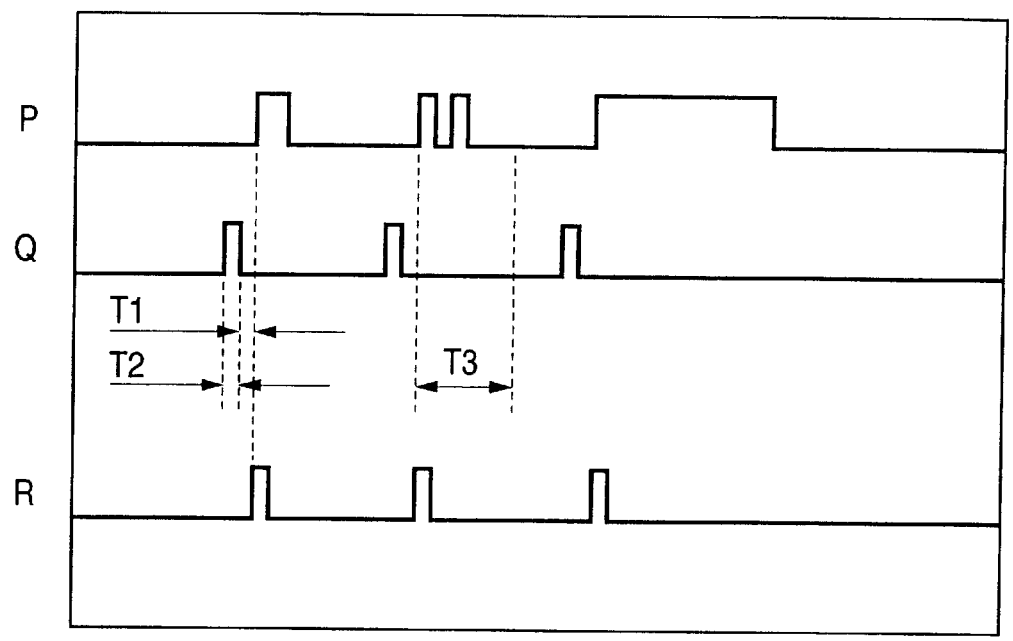
FIG. 18 is a diagram showing timing in connection with the example of the light emitting elements and light receiving elements incorporated in a mouse.

As to the input timing, in order to grasp a stable state of the position relation between the mouse gripping finger shape and the mouse, a three-dimensional finger shape is inputted not just before detection of the click button having been pushed but the instant the mouse pointer became still before the start of a click button pushing motion of a finger. This is because a finger is performing a click motion just before depression of the click button and therefore the dispersion of detected data may become conspicuous unless the detection is made at a sufficiently high speed. FIG. 18 is a timing chart taking this point into account. A logic signal P shown in FIG. 18 is a signal which goes high (H level) while the click button is pushed and which goes low (L level) in other cases. A logic signal Q reaches H level when identification of the mouse gripping fingers is performed, and becomes L level in other cases. Three-dimensional shape data of the mouse gripping fingers is inputted for time T2 which is before time T1, the time T1 lasting up to just before rise of the logic signal P, and there is made identification. T1 is set in the range of 0.05 to 0.2 second and T2 is set in the range of 0.01 to 0.2 second, provided both values may be adjusted suitably because the optimum value for enhancing the identification accuracy varies according to users.

When double-clicking the mouse, the click button is pushed twice ina short time, during which period the input motion should be avoided. To this end, the three-dimensional shape data inputting operation is inhibited for the period of time T3 in FIG. 18 after the clicking of identifying operation.

With plural click motions, a plurality of three-dimensional shape data or identification results are obtained for one user. In this connection, in the case of using a method wherein vector A or similarity data is stored in memory as three-dimensional shape data temporarily and identification is made thereafter, there is calculated one vector or similarity as a mean value and a three-dimensional finger shape is identified on the basis of the calculated value.

Further, at each individual click motion there is obtained an identification result at the foregoing timing, and from among the three-dimensional shape correlation data stored in memory beforehand there is selected a correlation data piece which is the largest in the number of coincidence in a certain time period, then the finger of that correlation data is concluded to be the final identification result. If there are plural pieces of correlation data which are the largest in the number of coincidence in the certain time period, identification results are further obtained to determine a correlation data piece larger in the number of coincidence.

In the timing chart shown in FIG. 18 it is necessary that the output vector from the correlation detecting unit 7, which is three-dimensional shape data of the mouth gripping finger, be detected before the mouth click button is depressed. To meet this requirement, vector A from the correlation detecting unit 7 or output waveform of the light receiving element, as three-dimensional shape data, or similarity or identification result in the case of the identifying operation being performed at all times, is obtained continuously at predetermined time interval and is stored in an FIFO (First In First Out) memory, and upon depression of the click button there is obtained three-dimensional finger shape data for identification or identification result as an output from the FIFO.

In connection with the identification interlocked with clicking of the mouse, a description has been given above about identification using plural timings at a certain instant of a three-dimensional shape of the mouse gripping fingers. Reference will now be made to a method wherein for a single click there are grasped different three-dimensional finger shapes at two instants and an identification result is obtained. In FIG. 18, a logic signal R, like the logic signal Q, becomes H level during input of a three-dimensional shape of the mouse gripping fingers and becomes L level in other cases, indicating that the three-dimensional finger shape is inputted just after arrival at H level of the logic signal P which indicates depression of the mouse. In this example, the foregoing logic signal Q indicates the timing of identifying the mouse gripping finger shape prior to clicking, while the logic signal R indicates the timing of identifying the mouse gripping finger shape in a depressed state of the click button. Thus, in interlock with a single click motion there is made identification twice with respect to different shapes of the same fingers.

Given that the data on the three-dimensional finger shape stored for identification is the vector A which is an output vector from the correlation detecting unit 7, the vector A obtained with the logic signal Q is assumed to be vector A1 and the vector A obtained with the signal R is assumed to be vector A2. The number of dimension of vector A is assumed to be S and a vector A3 of 2×S dimensions is defined by connecting the elements of vectors A1 and A2. Alternatively, only a component which changes with click motion is extracted from vector A2 and is connected to the element of vector A1 to define the vector A3.

In the identifying operation of this example, vector A3 is handled like vector A and there is made identification in the same way as in a series of similarity calculations and subsequent judgments which are associated with the identifying operation described above. Therefore, in comparison with determining the vector A3 alone, the number of data used for identification becomes larger and hence the identification accuracy is improved.

Identification at the timings indicated with logic signals Q and R is performed each independently. But in the case where the fingers identified at both timings prove to be of the same person, the final result is the result recognizing that the fingers are of the same person. In the case of designating the shape of fingers of a certain specific person and examining the truth thereof, the final result is concluded to be true when the identification results at both timings have become true. Also in this case identification is made twice at different shapes for the fingers of the same person, so that the identification accuracy for a person is improved.

Figure 19:
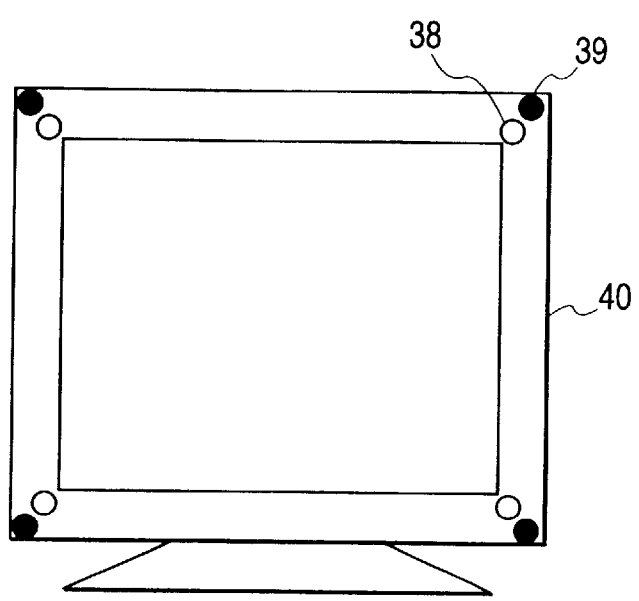
FIG. 19 is a diagram showing an example in which the light emitting elements and light receiving elements have been incorporated in a display.

FIG. 19 shows an example in which the light emitting elements and the light receiving elements both used in the three-dimensional object identifying system are incorporated in a display of an information apparatus. In this example, light emitting diodes 38 and photodiodes 39 are fitted in the four corners of a display body 40. The position and angle at which the same user faces the display body 40 are almost constant if the surrounding conditions remain unchanged. Also when sitting on a chair or standing up, the user performs almost constant motions.

In the three-dimensional object identifying system, the three-dimensional object to be identified is the whole body of the user, and the state of the user's body in user's motions is also identified. More specifically, three-dimensional shapes in plural states of legitimate user's motions in front of the display are stored in the memory beforehand, such as the state in which a legitimate user looks straight at the display, the state in which the user is trying to sit on a chair for display work, a plurality of continuous states observed at certain time intervals from the instant of the user having tried to sit on the chain up to the time when the user sat on the chair, the state in which the user is trying to stand up from the chair, and a plurality of continuous states observed at certain time intervals from the instant of the user having tried to stand up from the chair up to the time when the user stood up from the chair. In the three-dimensional object identifying system of this embodiment, identification is made for the state in which the user tried to sit on the chair, an intermediate state of the sitting motion, and the state after completion of the sitting motion. While recognizing such a series of states, the shape of a person, or the user, as a three-dimensional still object is identified, whereby there is obtained an identification result of higher accuracy. By so doing, moreover, it is possible to judge whether the user is a legitimate user or not without giving any incongruity sense to the user.

The three-dimensional object identifying system of the present invention is further applicable to the identification of such three-dimensional objects as agricultural products and industrial products.

Although in the above embodiment reference has been made to examples in which the light emitting elements and light receiving elements used in the three-dimensional object identifying system are incorporated in a keyboard input device, a mouse and a display, the present invention is not limited to those examples. Such light emitting elements and light receiving elements may be incorporated in other information apparatus than the personal computer, such as the body portions of television (TV) receiver and audio and video systems, or devices to be used by being held or grasped by hand such as remote controls used for the above apparatuses, and in this state a three-dimensional object may be identified. The present invention is also applicable to communication devices which are used while being grasped by hand, such as telephone sets connected to a public line, portable telephones, and PHP (Personal Handy Phone).

It is also possible to let user's cataloged information be held by another computer on a network. In the case where a client computer equipped with such an input device carries out an identifying processing, the client computer maybe configured so as to transmit data detected by light receiving elements to a server on the network which holds the cataloged information, allow identifying calculations to be conducted, and receive identification results. It is also possible to acquire user data from the server and perform identifying calculations.

According to the three-dimensional object identifying system of the present invention, as set forth above, a three-dimensional object can be identified by a small-sized and simple configuration. Further, where part or the whole of a human body is used as a three-dimensional object and the user is to be identified by identifying the three-dimensional object, the user is not required to perform any special operation and does not have any sense of incongruity.

What is claimed is:

1. A three-dimensional object identifying system comprising:
a surface;
a signal generating part that generates a modulation signal;
a light emitting part that emits light based on said modulation signal to a three-dimensional object, the light emitting part being integral to the surface;
a light receiving part that receives reflected light from said three-dimensional object and produces a detection signal, the light receiving part being integral to the surface;
a detecting part that detects correlation information on the correlation between said detection signal and said modulation signal; and
an identifying part that performs identifying processing for said three-dimensional object on the basis of both precataloged correlation information and said detected correlation information.

2. The three-dimensional object identifying system according to claim 1, wherein said detecting part detects correlation information plural times, and said identifying part performs identifying processing on the basis of both said pre-cataloged correlation information and the detected correlation information.

3. The three-dimensional object identifying system according to claim 1, wherein said identifying part detects said correlation information plural times continuously, and said identifying part identifies the motion of the three-dimensional object on the basis of both said pre-cataloged correlation information and the correlation information pieces detected plural times.

4. The three-dimensional object identifying system according to claim 1, wherein said light emitting part has a light emitting element, and said light receiving part has a light receiving element.

5. The three-dimensional object identifying system according to claim 4, wherein said light emitting part has a plurality of said light emitting elements, and lights are emitted to the three-dimensional object in plural directions from said plural light emitting elements.

6. The three-dimensional object identifying system according to claim 4, wherein said light emitting element emits an infrared light.

7. The three-dimensional object identifying system according to claim 4, wherein said light receiving part has a plurality of said light receiving elements and receives said reflected light at plural positions.

8. The three-dimensional object identifying system according to claim 1, wherein said signal generating part generates a plurality of modulation signals so that a cross correlation value becomes almost zero.

9. The three-dimensional object identifying system according to claim 8, wherein said plural modulation signals are a plurality of dipulse train signals of different timings, a plurality of trigonometric function signals of different periods, a plurality of trigonometric function signals which are of the same period but which are 90° out of phase, a plurality of burst sine wave signals of different timings, a plurality of pseudo noise code (PN code) signals of different timings, a plurality of M sequence code signals taken out from plural taps of a single M sequence generator, or a plurality of orthogonal code signals which are in a relation of almost zero in terms of a cross correlation value.

10. The three-dimensional object identifying system according to claim 1, wherein said signal generating part generates M kinds of modulation signals, said light emitting part has M number of light emitting elements which emit light respectively on the basis of said M kinds of modulation signals, said light receiving part has N number of light receiving elements, said detecting part has M×N (=S) number of correlation detectors which, on the basis of one kind of said detection signal and one kind of said modulation signal, each detects correlation information on the correlation between said detection signal and said modulation signal, different sets of said detection signal and said modulation signal are inputted respectively to said S number of correlation detectors, and said identifying part performs the identifying processing on the basis of S number of correlation functions detected from said S number of correlation detectors.

11. The three-dimensional object identifying system according to claim 10, wherein said correlation detectors are analog four-quadrant multipliers.

12. The three-dimensional object identifying system according to claim 10, wherein said correlation detectors are each provided with an operational amplifier having an inversional input terminal and a non-inversional input terminal and also provided with a switching part that switches over said detection signal to either said inversional input terminal or said non-inversional input terminal on the basis of said modulation signal.

13. The three-dimensional object identifying system according to claim 10, wherein a multiplexer for time-division processing is provided in an input portion of each of said correlation detectors.

14. The three-dimensional object identifying system according to claim 1, wherein said identifying part is provided with a memory which stores a correlation information, a similarity calculator which calculates similarity on the basis of the correlation information stored in said memory and the correlation information detected by said detecting part, and a discriminator which identifies said three-dimensional object on the basis of said similarity.

15. The three-dimensional object identifying system according to claim 14, wherein said detecting part detects a plurality of correlation information pieces for one three-dimensional object, said memory stores said plural correlation information pieces detected beforehand by said detecting part, and said similarity calculator calculates as similarity a Euclidean distance between a vector consisting of said plural correlation information pieces stored in advance and a vector consisting of said plural correlation information pieces later detected by said detecting part.

16. The three-dimensional object identifying system according to claim 15, wherein said detecting part detects the correlation information plural times for one three-dimensional object, and said memory stores a mean value of the correlation information pieces detected plural times by said detecting part.

17. The three-dimensional object identifying system according to claim 14, wherein said detecting part detects a plurality of correlation information pieces for one three-dimensional object, said memory stores a mean value vector and an inverse matrix of a variance-covariance matrix which are obtained on the basis of a vector comprising a plurality of correlation information pieces detected beforehand by said detecting part, and said similarity calculator calculates a Mahalanobis distance as similarity, said Mahalanobis distance being calculated on the basis of a vector comprising said plural correlation information pieces later detected by said detecting part, as well as said mean value vector and said inverse matrix of variance-covariance matrix.

18. The three-dimensional object identifying system according to claim 14, wherein said discriminator recognizes that a three-dimensional object corresponding to said stored correlation information for which a similarity indicating the closest similarity among any calculated plural similarities has been calculated and a three-dimensional object corresponding to said correlation information detected later are the same.

19. The three-dimensional object identifying system according to claim 14, wherein when said similarity indicates a similarity exceeding a predetermined threshold value, said discriminator recognizes that a three-dimensional object corresponding to said stored correlation information and a three-dimensional object corresponding to said correlation information detected later are the same.

20. The three-dimensional object identifying system according to claim 1, wherein said light emitting part and said light receiving part are incorporated in a predetermined member which is for resting fingers thereon, said predetermined member having depressions for resting fingers therein.

21. The three-dimensional object identifying system according to claim 1, wherein said light emitting part and said light receiving part are incorporated in a user interface device in an information apparatus.

22. The three-dimensional object identifying system according to claim 21, wherein said user interface device is a keyboard input device, and identification of the three-dimensional object is performed in interlock with a key depressing operation on the keyboard.

23. The three-dimensional object identifying system according to claim 21, wherein said user interface device is a mouse, and identification of the three-dimensional object is performed in interlock with an inputting operation conducted by a click button provided in said mouse.

24. The three-dimensional object identifying system according to claim 23, wherein identification of the three-dimensional object is performed at a time point shifted a predetermined time from the time point of input made by said click button.

25. The system of claim 1, further comprising: a keyboard input device for the input of data to an information apparatus, having incorporated therein the light emitting part and the light receiving part.

26. The system of claim 1, further comprising: a mouse for the input of data to an information apparatus, having incorporated therein the light emitting part and the light receiving part.

27. An information apparatus comprising:
   a general-purpose input device that inputs information corresponding to an input operation performed by an input operator;
   a processing unit that processes the information inputted from said general-purpose input part;
   a light emitting part that emits light to said input operator and that is integral to said input device;
   a light receiving part that receives reflected light from said input operator and that is integral to said input device; and
   an identifying part that acquires from said light receiving part light intensity information corresponding to the posture of at least a part of the body of said input operator when the input operator uses said general-purpose input device, and then performs identifying processing of the input operator on the basis of said light intensity information and cataloged information.

28. The information apparatus according to claim 27, wherein said identifying part performs identifying processing with use of light intensity information corresponding to specific input operation timing for said general-purpose input device.

29. The information apparatus according to claim 28, wherein said specific input operation timing indicates an instant at which a series of input operations are being performed for said information apparatus by said input operator and at which the body posture of said input operator has come to a standstill.

30. The information apparatus according to claim 27, wherein said general-purpose input device is a mouse.

31. The information apparatus according to claim 27, wherein said general-purpose input device is a keyboard.

32. The information apparatus of claim 27, further comprising: a general-purpose input device for the input of information to an information apparatus, connected to the information apparatus as the general-purpose input device, and integrally provided with the light emitting element and the light receiving element.

33. The general-purpose input device according to claim 32, which is a mouse.

34. The general-purpose input device according to claim 32, which is a keyboard.

* * * * *